(12) United States Patent
Upadhye et al.

(10) Patent No.: US 10,655,523 B2
(45) Date of Patent: May 19, 2020

(54) REAGENT INJECTOR FREEZE PROTECTION

(71) Applicant: Tenneco Automotive Operating Company Inc., Lake Forest, IL (US)

(72) Inventors: Abhijit P Upadhye, Ann Arbor, MI (US); Alan Brockman, Ann Arbor, MI (US); Olaf Enke, Clinton, MI (US); Mark Devito, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 16 days.

(21) Appl. No.: 16/045,036

(22) Filed: Jul. 25, 2018

(65) Prior Publication Data

US 2018/0328250 A1 Nov. 15, 2018

(51) Int. Cl.
*F01N 3/20* (2006.01)
*F02M 51/06* (2006.01)
(Continued)

(52) U.S. Cl.
CPC ......... *F01N 3/208* (2013.01); *B01D 53/9418* (2013.01); *F01N 3/2066* (2013.01); *F02M 51/0678* (2013.01); *F02M 53/043* (2013.01); *F01N 2610/02* (2013.01); *F01N 2610/11* (2013.01); *F01N 2610/146* (2013.01); *F01N 2610/1413* (2013.01); *F01N 2610/1433* (2013.01); *F01N 2610/1453* (2013.01); *F01N 2610/1486* (2013.01); *F02M 2200/26* (2013.01); *F02M 2200/8061* (2013.01); *F02M 2200/8084* (2013.01)

(58) Field of Classification Search
CPC .... F01N 3/2066; F01N 3/208; F01N 2610/02; F01N 2610/11; F01N 2610/1453; F01N 2610/1486; F02M 51/0671; F02M 51/0675; F02M 51/0678; F02M 53/043; F02M 2200/26
See application file for complete search history.

(56) References Cited

U.S. PATENT DOCUMENTS 7,316,545 B2 1/2008 Lenke
8,024,922 B2 9/2011 Van Vuuren et al.
(Continued)

FOREIGN PATENT DOCUMENTS

WO 2008049676 5/2008

*Primary Examiner* — Audrey K Bradley
(74) *Attorney, Agent, or Firm* — McGarry Bair PC

(57) ABSTRACT

An injector for injecting a reagent includes a first injector body and a second injector body. The first injector body includes an outlet opening. The second injector body includes a reagent tube. The second injector body is movable relative to the first injector body. The injector further includes a valve assembly at least partly enclosed by the first injector body. The valve assembly is configured to selectively dispense the reagent through the outlet opening of the first injector body. The injector further includes a spring member positioned between the first injector body and the second injector body. The spring member is pre-loaded to bias the second injector body towards the first injector body. The spring member is further configured to limit a maximum movement of the second injector body relative to the first injector body in response to expansion of the reagent during freezing.

20 Claims, 18 Drawing Sheets

(51) Int. Cl.
    *F02M 53/04*     (2006.01)
    *B01D 53/94*     (2006.01)

(56) References Cited

U.S. PATENT DOCUMENTS

| | | | |
|---|---|---|---|
| 9,222,386 B2 * | 12/2015 | Schepers | F01N 3/2066 |
| 2004/0046060 A1 * | 3/2004 | Maurer | F02M 51/0603 |
| | | | 239/533.2 |
| 2005/0069468 A1 * | 3/2005 | Huber | F01N 3/2066 |
| | | | 422/172 |
| 2008/0236147 A1 * | 10/2008 | Van Vuuren | F01N 3/2066 |
| | | | 60/295 |
| 2013/0061578 A1 * | 3/2013 | Van Vuuren | F01N 3/2066 |
| | | | 60/295 |
| 2013/0228231 A1 | 9/2013 | Nagel et al. | |
| 2016/0169176 A1 * | 6/2016 | Mayer | F02M 61/14 |
| | | | 123/189 |
| 2017/0226912 A1 | 8/2017 | Diouf et al. | |

* cited by examiner

REAGENT INJECTOR FREEZE PROTECTION

TECHNICAL FIELD

The present disclosure relates to injectors and, more particularly, relates to an injector for injecting a reagent into an exhaust stream of an engine.

BACKGROUND

Lean burn engines provide improved fuel efficiency by operating with an excess of oxygen, that is, a quantity of oxygen that is greater than the amount necessary for complete combustion of the available fuel. Such engines are said to run "lean" or on a "lean mixture." However, this improved or increase in fuel economy, as opposed to non-lean burn combustion, is offset by undesired pollution emissions, specifically in the form of oxides of nitrogen (NOx).

One method used to reduce NOx emissions from lean burn internal combustion engines is known as selective catalytic reduction (SCR). SCR, when used, for example, to reduce NOx emissions from a diesel engine, involves injecting an atomized reagent into the exhaust stream of the engine in relation to one or more selected engine operational parameters, such as exhaust gas temperature, engine revolutions per minute (RPM) or engine load as measured by engine fuel flow, turbo boost pressure or exhaust NOx mass flow. The reagent/exhaust gas mixture is passed through a reactor containing a catalyst, such as, for example, activated carbon, or metals, such as platinum, vanadium or tungsten, which are capable of reducing the NOx concentration in the presence of the reagent. Typically, an injector is used for injecting the reagent into the exhaust stream of the engine.

An aqueous urea solution is known to be an effective reagent in SCR systems for diesel engines. However, use of such an aqueous urea solution involves many disadvantages. One of the disadvantages is the expansion of aqueous urea solution in frozen condition due to the formation of ice. Aqueous urea solution may tend to freeze in some situations, such as cold weather. Expansion of aqueous urea solution in frozen condition may damage one or more components of the injector. The injector may then have to be repaired or replaced, resulting in downtime and increased costs. Freezing of the reagent may also cause the injector to malfunction resulting in unwanted deposits in an exhaust system. Similarly, any other fluid delivery component may be damaged due to freezing of fluid.

Accordingly, it may be desirable to provide an improved reagent injector addressing some or all of these concerns.

SUMMARY

In an aspect of the present disclosure, an injector for injecting a reagent is provided. The injector includes a first injector body and a second injector body. The first injector body includes an outlet opening. The second injector body includes a reagent tube. The second injector body is movable relative to the first injector body. The injector further includes a valve assembly at least partly enclosed by the first injector body. The valve assembly is configured to selectively dispense the reagent through the outlet opening of the first injector body. The injector further includes a spring member positioned between the first injector body and the second injector body. The spring member is pre-loaded to bias the second injector body towards the first injector body. The spring member is further configured to limit a maximum movement of the second injector body relative to the first injector body in response to expansion of the reagent during freezing.

In an embodiment of the present disclosure, the spring member may be further configured to at least partially cover a first end of the first injector body. In another embodiment, the spring member may be further configured to bias the valve assembly towards the first injector body. In an embodiment, the injector may further include a sealing member disposed between the second injector body and one of the valve assembly and the first injector body.

In another aspect of the present disclosure, an injector for injecting a reagent is provided. The injector includes a first injector body and a second injector body. The first injector body includes an outlet opening. The second injector body includes a reagent tube. The second injector body is movable relative to the first injector body in response to expansion of the reagent during freezing. The injector further includes a valve assembly at least partly enclosed by the first injector body. The valve assembly is configured to selectively dispense the reagent through the outlet opening of the first injector body. The injector further includes a flat spring positioned between the first injector body and the second injector body. The flat spring is pre-loaded to bias the second injector body towards the first injector body. The flat spring is further configured to apply a biasing force against a pressure exerted by the reagent during freezing.

In an aspect of the present disclosure, an injector for injecting a reagent is provided. The injector includes a first injector body and a second injector body. The first injector body includes an outlet opening. The second injector body includes a reagent tube. The second injector body is movable relative to the first injector body. The injector further includes a valve assembly at least partly enclosed by the first injector body. The valve assembly is configured to selectively dispense the reagent through the outlet opening of the first injector body. The injector further includes a spring member. The spring member includes a main portion pressed against a surface of the second injector body, at least one elongate portion connected to the first injector body, and an intermediate portion disposed between the main portion and the at least one elongate portion. The intermediate portion is adapted to deform to allow movement of the second injector body relative to the first injector body. The spring member is pre-loaded to bias the second injector body towards the first injector body. The spring member is further configured to limit a maximum movement of the second injector body relative to the first injector body in response to expansion of the reagent during freezing. In an embodiment, the limit to the movement of the second injector body may be an end stop.

In another embodiment, the spring member may further include another intermediate portion extending from the at least one elongate portion and adapted to at least partially cover a first end of the first injector body.

Other features and aspects of this disclosure will be apparent from the following description and the accompanying drawings.

DETAILED DESCRIPTION

Example embodiments will now be described more fully with reference to the accompanying drawings.

It should be understood that although the present teachings may be described in connection with diesel engines and the reduction of nitrogen oxides (NOx) emissions, the present teachings can be used in connection with any one of a number of exhaust streams, such as, by way of non-limiting examples, those from gasoline, turbine, fuel cell, jet or any other power source outputting a discharge stream. Moreover, the present teachings can be used in connection with the reduction of any one of a number of undesired emissions.

Figure 1:
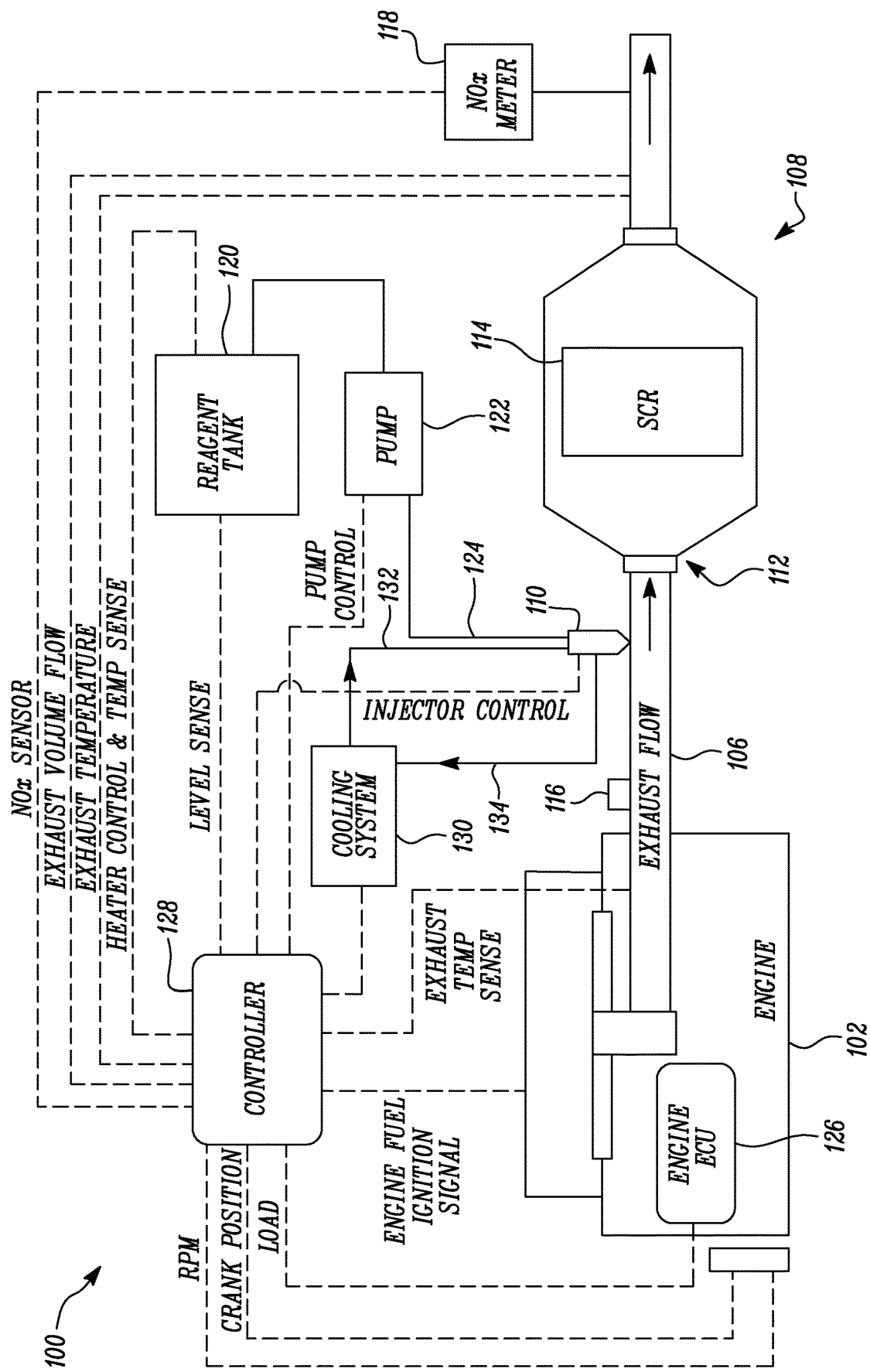
FIG. 1 is a schematic diagram depicting an exemplary exhaust aftertreatment system including a reagent injector, according to an aspect of the present disclosure.
Figure 2:
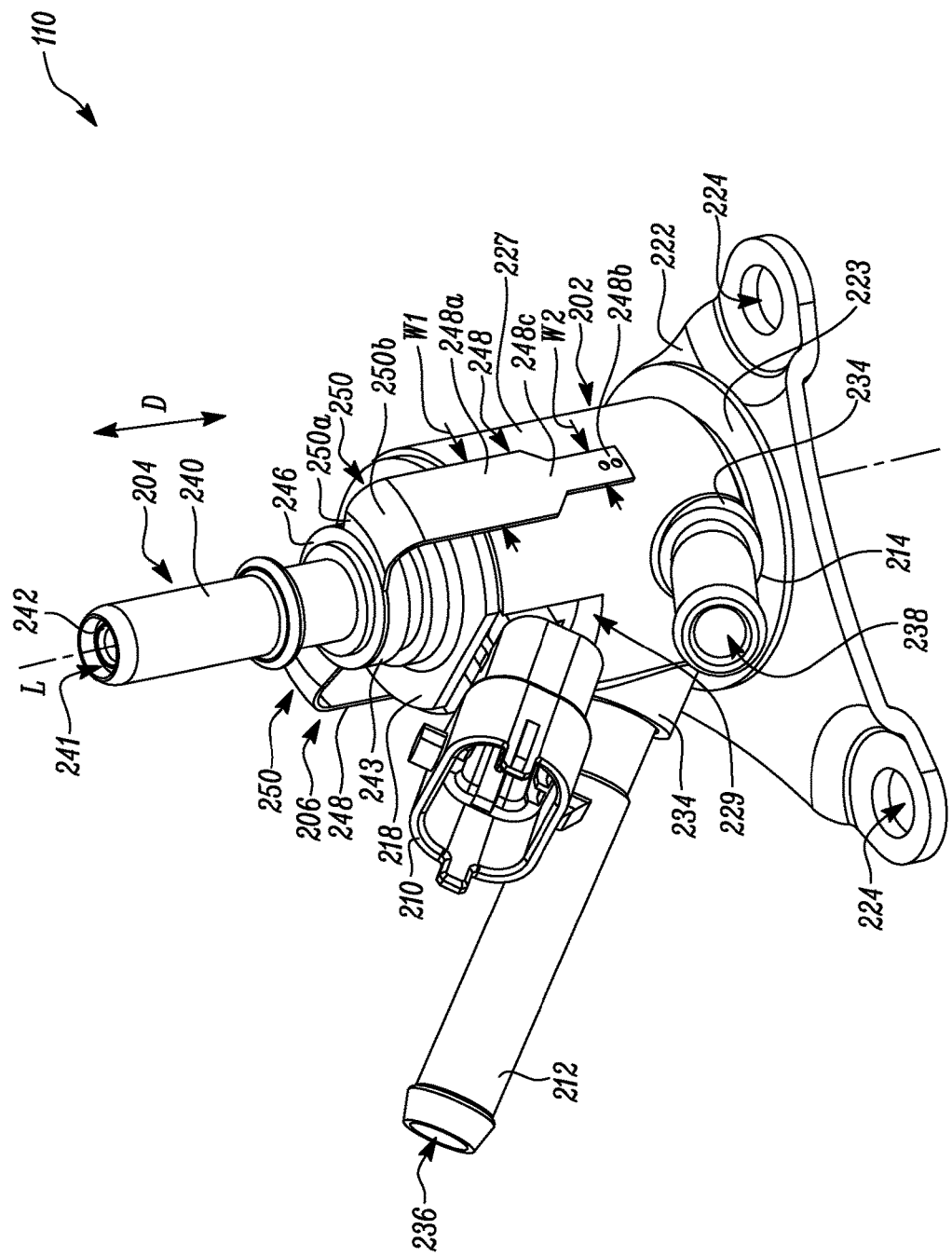
FIG. 2 is a perspective view of the reagent injector, according to an aspect of the present disclosure.
Figure 3:
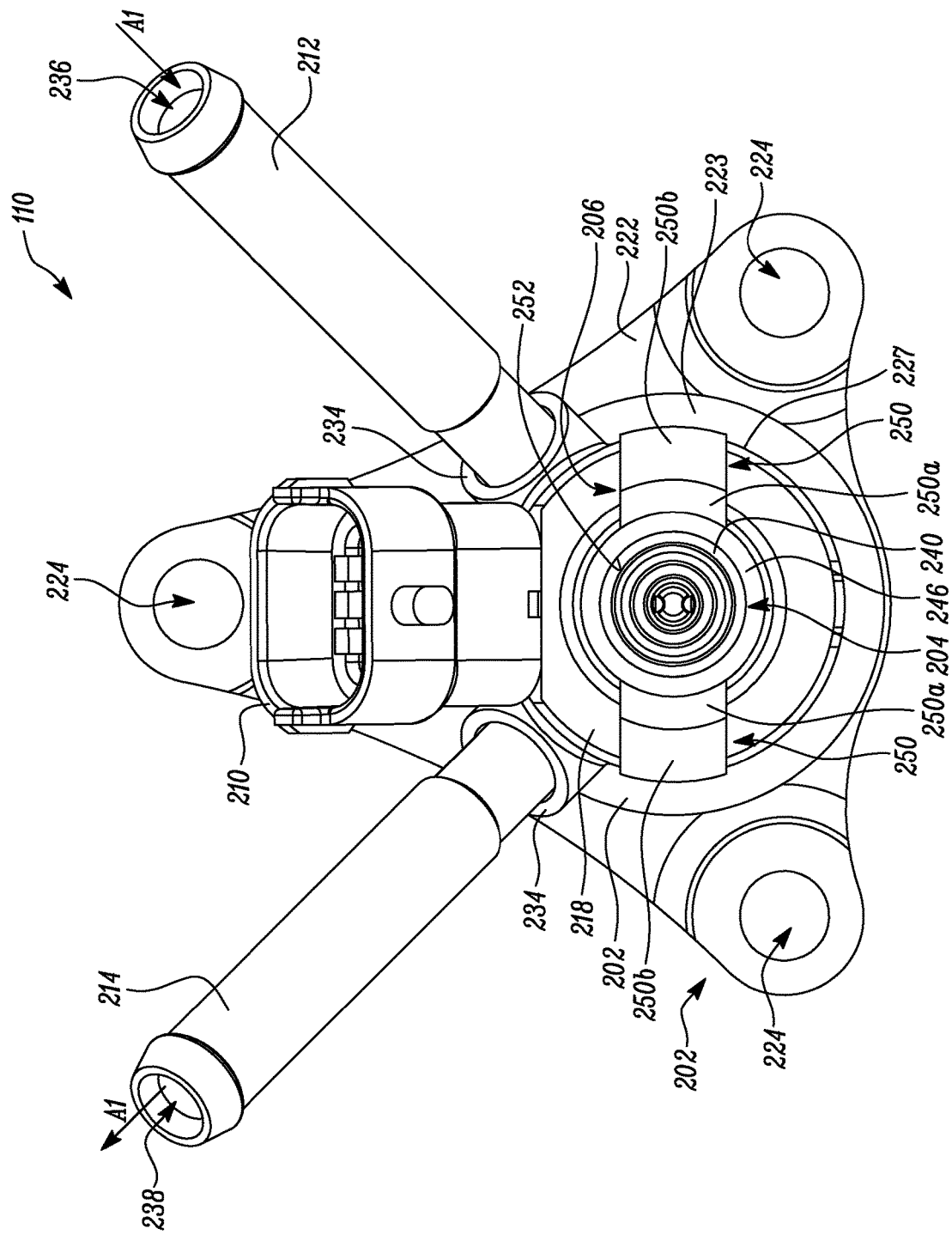
FIG. 3 is a top view of the reagent injector of FIG. 2.
Figure 4:
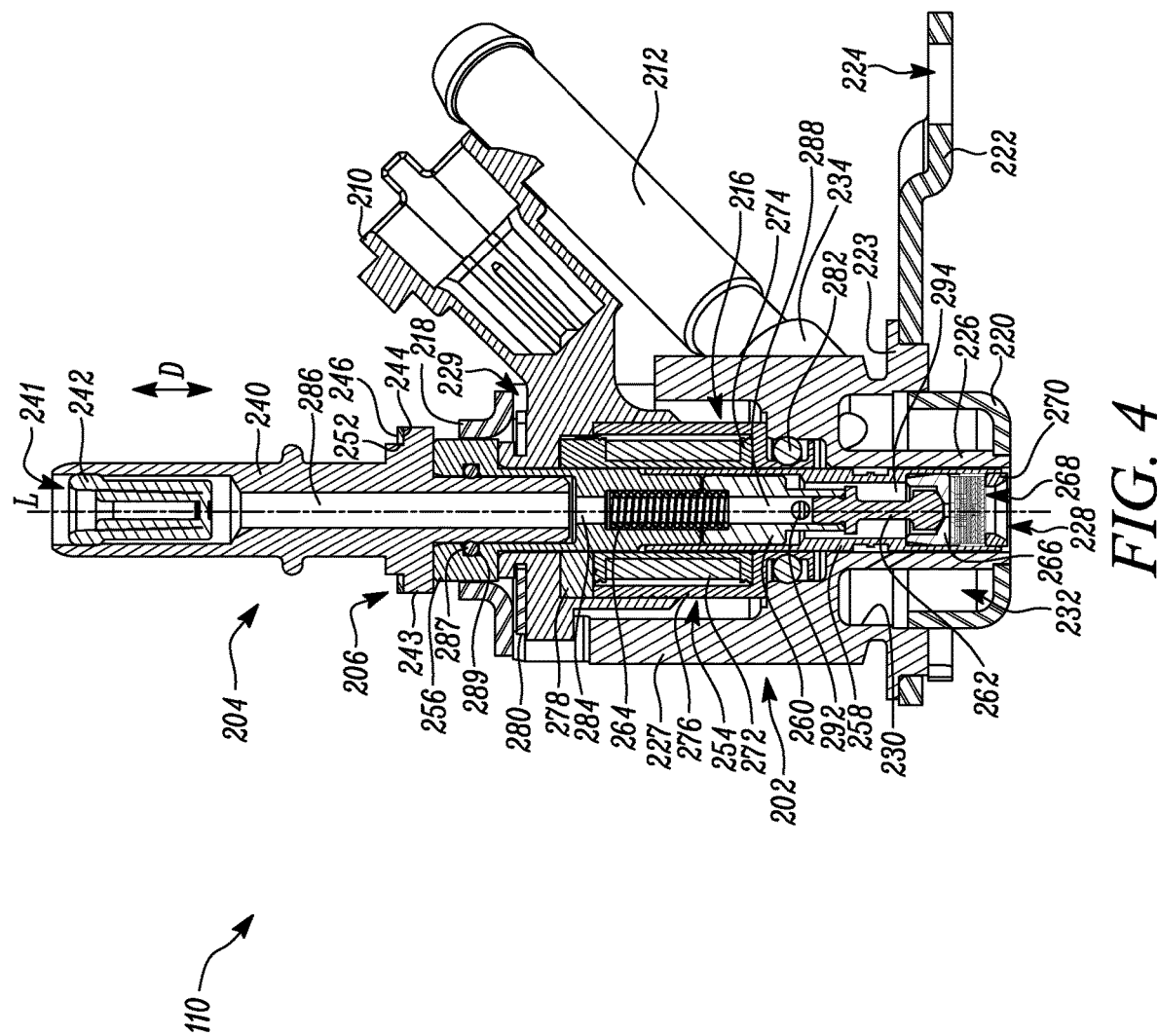
FIG. 4 is a sectional view of the reagent injector of FIG. 2.

Wherever possible, the same reference numbers will be used throughout the drawings to refer to same or like parts. FIG. 1 illustrates an exemplary exhaust system 100 for an engine 102. In FIG. 1, solid lines between elements of the exhaust system 100 denote fluid lines and dashed lines denote electrical connections. The engine 102 may be in communication with a fuel source that, once consumed, will produce exhaust gases that are discharged into an exhaust pipe or conduit 106 having an exhaust after-treatment system 108. The exhaust after-treatment system 108 may include an exhaust treatment component 112 that is disposed downstream from the engine 102. In the illustrated embodiment, the exhaust treatment component 112 includes a Selective Catalytic Reduction (SCR) component 114. The SCR component 114 may include a catalyst bed for catalytic reduction of NOx emissions in the exhaust stream. However, in other embodiments, the exhaust treatment component 112 may additionally include a Diesel Oxidation Catalyst (DOC) and a Diesel Particulate Filter (DPF). The exhaust treatment component 112 can further include components, such as a thermal enhancement device or burner 116 to increase a temperature of the exhaust gases passing through the exhaust conduit 106. Increasing the temperature of the exhaust gas is favorable to achieve light-off of the catalyst in the exhaust treatment component 112 in cold-weather conditions and upon start-up of the engine 102, as well as initiate regeneration of the exhaust treatment component 112 when the exhaust treatment component 112 includes a DPF.

To assist in reduction of emissions produced by the engine 102, the exhaust after-treatment system 108 includes an injector 110 for periodically dosing an exhaust after-treatment fluid or reagent into the exhaust stream of the engine 102. The injector 110 may be located upstream of the exhaust treatment component 112 and is operable to inject the reagent into the exhaust stream. The injector 110 is in fluid communication with a reagent tank 120 and a pump 122 via a supply line 124. A filter (not shown) may be optionally provided between the pump 122 and the reagent tank 120. The reagent may be a urea solution, a Diesel Exhaust Fluid (DEF), AdBlue®, or the like. It should also be appreciated that one or more reagents can be available in the system and can be used singly or in combination. Although a single injector 110 is illustrated in FIG. 1, multiple such injectors 110 may also be contemplated by the present disclosure. In another embodiment, the injector 110 may also be used with an air assist injector.

The amount of reagent required may vary with load, engine revolutions per minute (RPM), engine speed, exhaust gas temperature, exhaust gas flow, engine fuel injection timing, barometric pressure, relative humidity, engine coolant temperature, exhaust gas recirculation (EGR) rate and desired NOx reduction. A NOx sensor or meter 118 is positioned downstream from the SCR component 114. The NOx sensor 118 is operable to output a signal indicative of the exhaust NOx content to an Engine Control Unit (ECU) 126. All or some of the engine operating parameters may be supplied from the ECU 126 via an engine/vehicle databus to an electronic injection controller 128. The electronic injection controller 128 may also be included as part of the ECU 126. Exhaust gas temperature, exhaust gas flow, and exhaust back pressure may be measured by respective sensors (not shown). The electronical injection controller 128 may control the injector 110 to regulate injection of the reagent into the exhaust stream of the engine 102.

Temperature-sensitive reagents, such as aqueous urea, tend to solidify upon exposure to elevated temperatures of 300° C. to 650° C. that may be experienced in an engine exhaust system. It may be desirable keep the reagent below 140° C. and preferably in a lower operating range between 5° C. and 95° C. to ensure that solidification of urea is prevented. Solidified urea, if allowed to form, may foul moving parts, openings and passageways of the injector 110. To maintain lower operating temperatures, the injector 110 may be supplied with a fluid that acts as a coolant. In the illustrated embodiment, the fluid is different from the reagent and is supplied by a cooling system 130. In an embodiment, the cooling system 130 may be an engine coolant system, and may include various components, such as a radiator, a fan, a fluid tank, fluid conduits, one or more valves, and so forth. In such a case, the fluid may be water or an aqueous solution. The fluid may be supplied to the injector 110 via a fluid supply line 132. A fluid return line 134 allows the fluid to be returned to the cooling system 130 for cooling and recirculation. One or more components (e.g., valves, filters, etc.) may be provided in the fluid supply line 132 and/or the fluid return line 134. In an embodiment, the cooling system 130 may include a dedicated pump for supplying the injector 110 with the fluid. The pump may be controlled based on a temperature of the reagent.

Although a separate cooling system 130 for the injector 110 is illustrated in FIG. 1, alternative cooling configurations may also be contemplated within the scope of the present disclosure. In an embodiment, the reagent may be recirculated within the injector 110 to provide cooling. Instead of the cooling system 130, a return line (not shown) may be provided between the injector 110 and the reagent tank 120 to enable recirculation of the reagent. The configuration of the injector 110 may accordingly vary.

In some situations, such as cold ambient temperatures, the reagent supplied to the injector 110 may tend to freeze. Reagents, such as aqueous urea, tend to expand during freezing. This expansion in frozen condition is due to the formation of ice. Such expansion of the reagent may damage one or more components of the injector 110 due to the pressure exerted by ice. The injector 110, according to the present disclosure, incorporates a freeze protection feature that may allow expansion of the reagent in an extended configuration, while preventing any damage to the injector 110. The freeze protection feature may further allow the injector 110 to move back to a normal configuration when the reagent (i.e., ice) has thawed.

The injector 110 will be further described with reference to FIGS. 2 to 7. The injector 110 is provided for injecting a reagent into the exhaust stream of the engine 102 (shown in FIG. 1). The injector 110 includes a first injector body 202 (hereinafter referred to as "the first body 202"), a second injector body 204 (hereinafter referred to as "the second body 204"), a spring member 206, an electrical connector housing 210 (hereinafter referred to as "the connector housing 210"), a fluid inlet tube 212, a fluid outlet tube 214, and a valve assembly 216. The injector 110 may define a longitudinal axis 'L' extending along a length of the injector 110.

The first body 202 may be substantially hollow and at least partially encloses the valve assembly 216. Further, the first body 202 may be open at a top end and a bottom end. A top cap 218 may at least partly cover the top end of the first body 202. The bottom end of the first body 202 may be covered by a bottom cap 220. A mounting flange 222 is further connected to the first body 202 at the bottom end. The first body 202 includes an extending portion 223 for coupling with the mounting flange 222. The mounting flange 222 defines multiple flange apertures 224. The flange apertures 224 enable the mounting flange 222 to be mounted on the exhaust conduit 106 (shown in FIG. 1) via mechanical fasteners, such as bolts. In an alternative embodiment, the mounting flange 222 may be integral with the first body 202. The first body 202 also includes a conduit portion 226 at the bottom end. The conduit portion 226 may have a hollow configuration. The conduit portion 226 defines an outlet opening 228 for discharge of the reagent. The bottom cap 220 and the mounting flange 222 may be connected to the first body 202 via various methods, such as welding, brazing, adhesives, mechanical fasteners, interference fit, and so forth. In an embodiment, the bottom cap 220 and/or the mounting flange 222 may be detachably connected to the first body 202.

The first body 202 further includes an upper portion 227. The upper portion 227 includes a connector opening 229 for receiving the connector housing 210 therethrough. The extending portion 223 may extend from the upper portion 227. The conduit portion 226 may also extend from the upper portion 227. The top cap 218 may be disposed on the upper portion 227.

In the illustrated embodiment, the first body 202 further includes a recessed portion 230 proximate to the bottom end. The recessed portion 230 and the bottom cap 220 may together define a fluid chamber 232. The fluid chamber 232 may at least partly surround the conduit portion 226. The first body 202 further includes a pair of receiving portions 234 for at least partly receiving the fluid inlet and outlet tubes 212, 214. The receiving portions 234 may be embodied as bosses extending from the first body 202. The receiving portions 234 may be angularly spaced part from each other on an outer surface of the first body 202. The fluid inlet and outlet tubes 212, 214 may be connected to the respective receiving portions 234 of the first body 202 via various methods, such as welding, brazing, adhesives, mechanical fasteners, interference fit, and so forth. In an embodiment, the fluid inlet and outlet tubes 212, 214 may be detachably connected to the first body 202. The receiving portions 234 may also be inclined with respect to the longitudinal axis 'L' of the injector 110. Therefore, the fluid inlet and outlet tubes 212, 214 may also be inclined with respect to the longitudinal axis 'L'.

The fluid inlet and outlet tubes 212, 214 may be hollow tubes that allow a flow of a fluid therethrough. The fluid inlet and outlet tubes 212, 214 may be in fluid communication with the fluid chamber 232. Further, the fluid inlet tube 212 defines a fluid inlet 236 disposed in fluid communication with the fluid chamber 232. Similarly, the fluid outlet tube 214 defines a fluid outlet 238 disposed in fluid communication with the fluid chamber 232. The fluid inlet 236 may be arranged to receive a fluid that is different from the reagent. In an embodiment, the fluid may be a coolant (e.g., water). The fluid inlet 236 may receive the fluid from the cooling system 130 (shown in FIG. 1) via the fluid supply line 132. The intake and discharge of the fluid are indicated by arrows 'A1' in FIG. 3. Further, the fluid outlet 238 may discharge the fluid to the fluid return line 134. The fluid may flow into the fluid chamber 232 through the fluid inlet tube 212, as indicated by an exemplary fluid flow path 'F' in FIG. 5. A fluid passage 239 of the fluid inlet tube 212 may be in fluid communication with an inclined bore 245 of the first body 202. The inclined bore 245 is in fluid communication with the fluid chamber 232. Further, the fluid in the fluid chamber 232 may exit the injector 110 through the fluid outlet tube 214. A flow passage (not shown) of the fluid outlet tube 214 may be in fluid communication with another inclined bore (not shown) of the first body 202. This inclined bore may be in fluid communication with the fluid chamber 232. The fluid in the fluid chamber 232 may cool the conduit portion 226 of the first body 202. Therefore, one or more components of the valve assembly 216 that are at least partly received within the conduit portion 226 may be cooled. The reagent flowing through the conduit portion 226 may also be cooled. This may substantially prevent solidification of the reagent due to high temperatures of the exhaust system 100 and improves operability of the injector 110.

The second body 204 includes a reagent tube 240. The reagent tube 240 may be oriented substantially parallel to the longitudinal axis 'L'. Further, the reagent tube 240 may be substantially hollow with open ends. The reagent tube 240 may receive the reagent from the pump 122 (shown in FIG. 1) via the supply line 124. The reagent tube 240 further receives the reagent at a reagent inlet 241. The reagent tube 240 includes an inlet filter 242 through which the reagent passes. The second body 204 further includes a flange section 243 extending from the reagent tube 240. The flange section 243 may have a stepped configuration and includes an upper surface 244.

In an embodiment, the second body 204 may be movable with respect to the first body 202. Further, the second body 204 may be movable along an axial direction 'D' that is substantially parallel to the longitudinal axis 'L' of the injector 110. The spring member 206 is positioned between the first body 202 and the second body 204. Further, the spring member 206 may movably connect the second body 204 to the first body 202. In an embodiment, the spring member 206 may be a substantially flat spring. Further, the spring member 206 may be formed by at least one stamping or molding process. In a further embodiment, the spring member 206 may be made of a metal or a metal alloy. The spring member 206 includes a main portion 246, at least one elongate portion 248, and at least one intermediate portion 250 disposed between the main portion 246 and the at least one elongate portion 248. In the illustrated embodiment, the spring member 206 includes a pair of elongate portions 248 and a pair of intermediate portions 250. In an alternative embodiment, each of the pair of elongate portions 248 may have a zig-zag shape to provide additional travel of the second body 204. Each of the pair of intermediate portions 250 is disposed between the main portion 246 and a corresponding elongate portion 248. The main portion 246 is disposed on the flange section 243 of the reagent tube 240. Further, the main portion 246 is pressed against the upper surface 244 of the flange section 243. In another embodiment, the main portion 246 may be connected to a substantially circular area of the flange section 243 of the reagent tube 240. The main portion 246 may have an annular shape defining a main aperture 252. Though in the illustrated embodiment, the main aperture 252 has a substantially circular shape, other shapes of the main aperture 252 may be contemplated within the scope of the present disclosure. Such shapes of the main aperture 252 may include polygonal, elliptical, etc. The main aperture 252 is at least partially arranged around the reagent tube 240. The main aperture 252 therefore allows the reagent tube 240 to extend therethrough. In an embodiment, the main portion 246 may be press-fitted on the flange section 243 of the second body 204. In other embodiments, the main portion 246 may be attached to the second body 204 by various methods, such as welding, brazing, adhesives, mechanical fasteners, and so forth. In another embodiment, the main portion 246 may be detachably connected to the second body 204.

The intermediate portions 250 may extend from diametrically opposite sides of the main portion 246. In an undeformed or normal state, each of the intermediate portions 250 has a curvilinear shape that extends upwards from the main portion 246 and then curves downwards towards the respective elongate portion 248. Specifically, each intermediate portion 250 includes a first section 250a that extends upwards from the main portion 246, and a second section 250b that curves downwards and meets the respective elongate portion 248. In an embodiment, the first section 250a may have a substantially planar shape. The first section 250a is further inclined at an angle 'Ag' (shown in FIG. 6) with respect to the main portion 246 in the undeformed state or configuration. The second section 250b has a curved shape and connects the first section 250a to the respective elongate portion 248. Each intermediate portion 250 is adapted to deform to allow movement of the second body 204 relative to the first body 202. Specifically, each intermediate portion 250 deforms to allow movement of the second body 204 away from the first body 202 along the axial direction 'D'.

Figure 7:
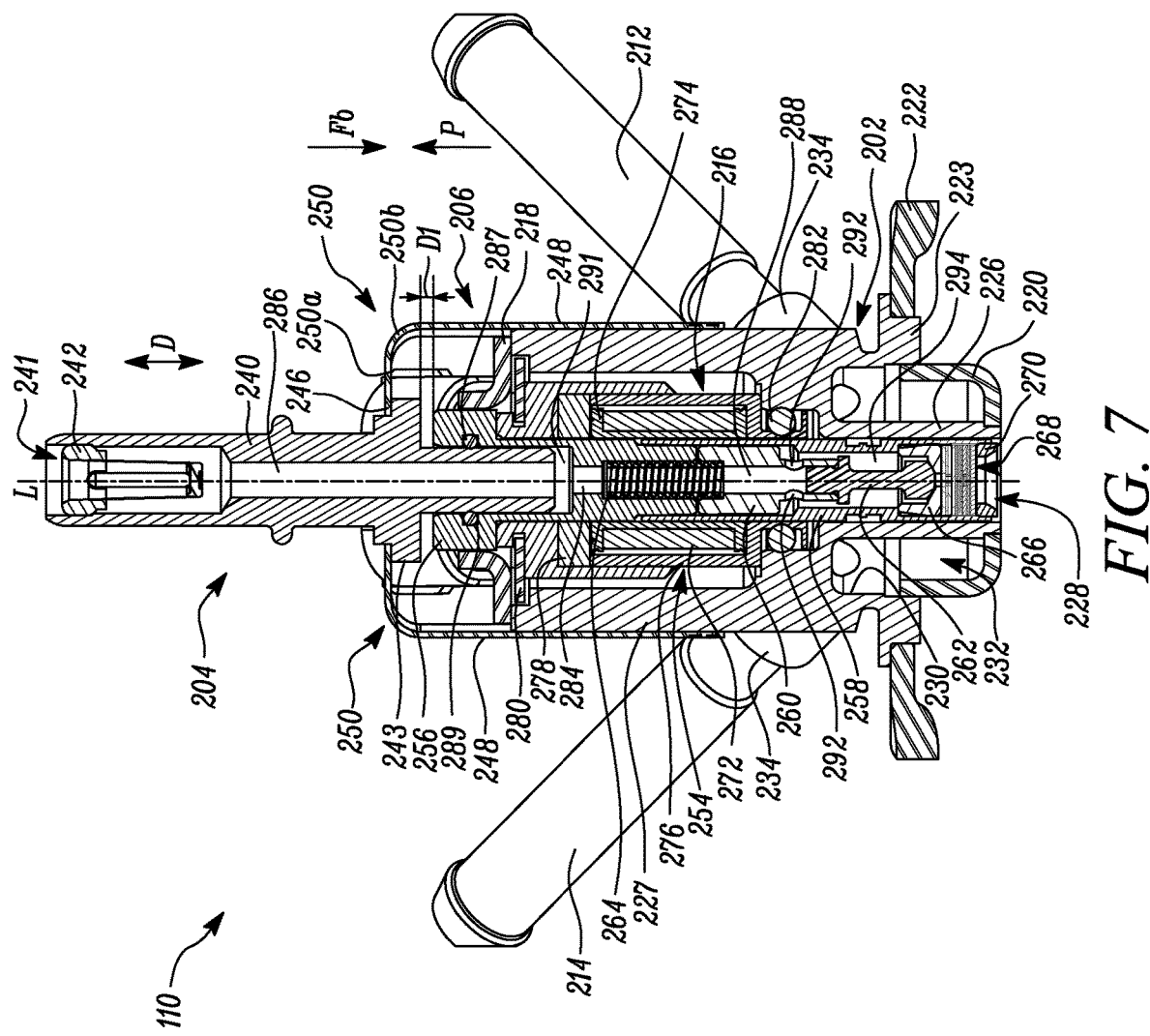
FIG. 7 is a sectional view of the reagent injector of FIG. 2 in an extended configuration, according to an aspect of the present disclosure.
Figure 8:
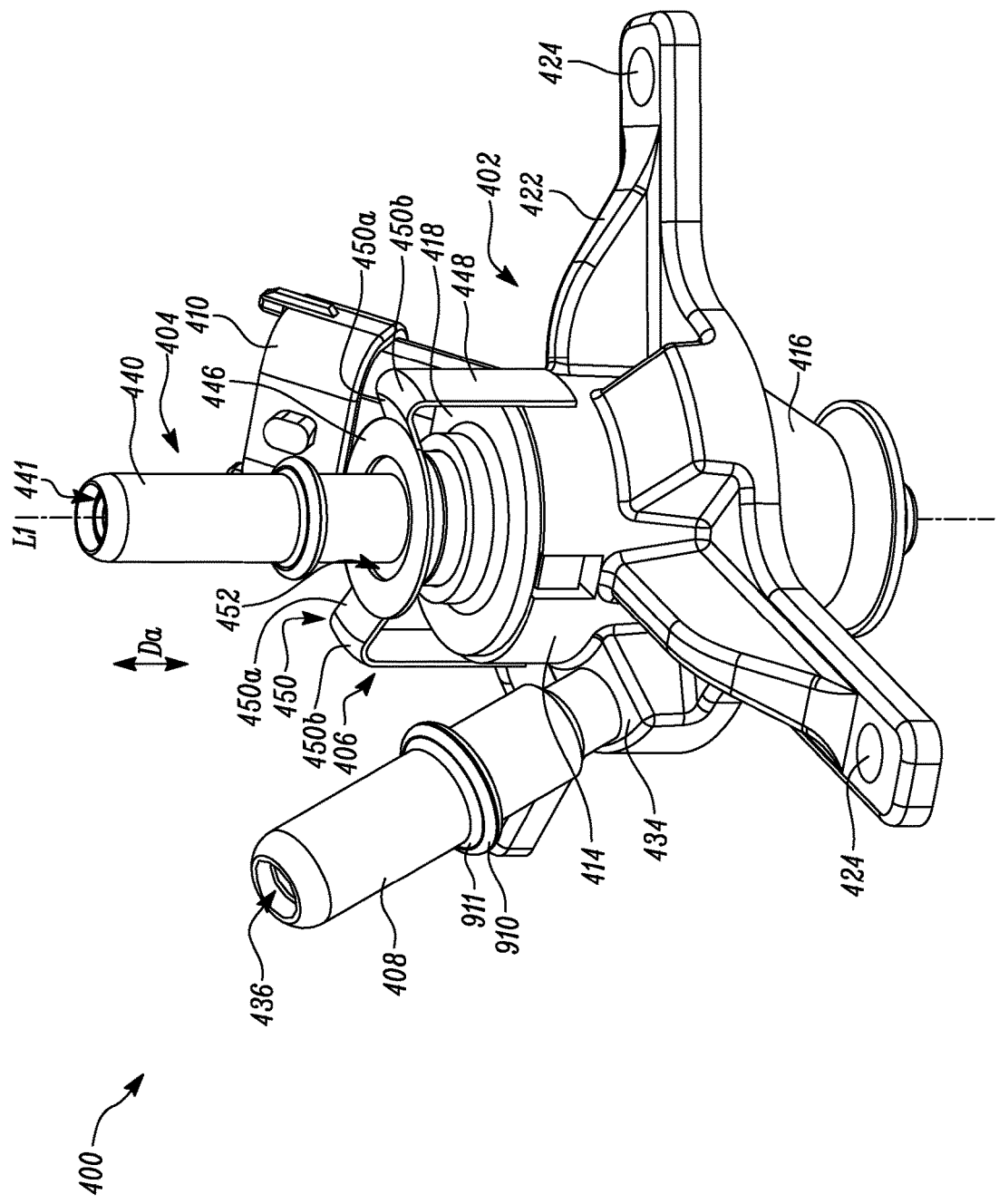
FIG. 8 is a perspective view of a reagent injector, according to another aspect of the present disclosure.

In the deformed state or configuration, as shown in FIG. 7, the first section 250a is oriented substantially parallel to the main portion 246, i.e., an angle between them is substantially zero. After each intermediate portion 250 is deformed or flexed to a point where the first section 250a is oriented substantially parallel to the main portion 246, the spring member 206 may limit the maximum axial movement of the second body 204 relative to the first body 202. A distance 'D1' (shown in FIG. 7) may correspond to the maximum axial movement of the second body 204 relative to the first body 202. The distance 'D1' may be the distance between the second body 204 and the pole piece 256.

Each elongate portion 248 includes a first region 248a, a second region 248b, and a third region 248c disposed between the first and second regions 248a, 248b. The first region 248a extends from the second section 250b of the respective intermediate portion 248. The second region 248b may be connected to the first body 202. Each of the first region 248a and the second region 248b may have a substantially planar shape. In the illustrated embodiment, a width 'W1' (shown in FIG. 2) of the first region 248a is greater than a width 'W2' of the second region 248b. Further, the third region 248c has a tapered shape and connects the first region 248a to the second region 248b. In an embodiment, the second region 248b of the elongate portion 248 is connected to the first body 202 by welding. In other embodiments, the second region 248b may be connected to the first body 202 by various methods, such as brazing, mechanical fasteners, adhesives, and so forth. In some embodiments, the first and/or third regions 248a, 248c of the elongate portion 248 may also be connected to the first body 202 by various methods. In another embodiment, each elongate portion 248 may be detachably connected to the first body 202 by any non-permanent joining method. Such a detachable connection may enable the second body 204 to be removed from the first body 202, thereby allowing servicing and/or replacement of one or more internal components (e.g., the valve assembly 216) of the injector 110. In a further embodiment, each elongate portion 248 may be connected to the first body 202 by a snap-fit connection.

In an embodiment, the spring member 206 is pre-loaded to bias the second body 204 towards the first body 202. In another embodiment, the spring member 206 is further configured to bias or push the valve assembly 216 towards the first body 202. The second body 204 may move against the biasing of the spring member 206 in response to expansion of the reagent during freezing. The spring member 206 is further configured to limit a maximum movement of the second body 204, relative to the first body 202, in response to expansion of the reagent during freezing. Specifically, the spring member 206 may apply a biasing force 'Fb' against a pressure 'P' exerted by the reagent during freezing. The reagent may expand in a frozen condition due to the formation of ice. Expansion of the reagent is therefore caused by expansion of ice. The pressure 'P' is exerted by ice that is formed due to freezing of the reagent. In an embodiment, the limit to the movement of the second body 204 may be an end stop.

The valve assembly 216 (shown in FIGS. 4 to 7) includes an electromagnet 254, a pole piece 256, an outer tube 258, an inner tube 260, a valve member 262, a return spring 264, a seat member 266, a nozzle portion 268, and an end member 270. In an embodiment, the valve assembly 216 may be a removable or replaceable cartridge assembly. The valve assembly 216 can therefore be removed from the injector 110 and replaced with another valve assembly, if required. In alternative embodiments, the valve assembly 216 may not be removable from the injector 110. The valve assembly 216 is configured to selectively dispense the reagent through the outlet opening 228 of the first body 202.

The electromagnet 254 includes a coil 272, a bobbin 274, a tube 276, and an end cap 278. The electromagnet 254 may be disposed within the first body 202. The coil 272 includes a coil of wire wrapped around the bobbin 274. The tube 276 at least partly surrounds the bobbin 274. The tube 276 may be supported on a shoulder of the first body 202. The end cap 278 at least partly covers the bobbin 274 and the tube 276 from the top. The end cap 278 and the tube 276 may constitute a flux frame of the electromagnet 254. The connector housing 210 is connected to the electromagnet 254. Specifically, the connector housing 210 may be connected to the flux frame of the electromagnet 254. A retaining ring 280 may be provided in a groove of the connector housing 210. The retaining ring 280 may be further supported on another shoulder of the first housing 202. The retaining ring 280 may retain and/or support the connector housing 210 within the first housing 202. In another embodiment, the connector housing 210 may be overmolded on the electromagnet 254. In other embodiments, the connector housing 210 may be connected to the electromagnet 254 by various methods, such as welding, brazing, mechanical fasteners, adhesives, interference fit, and so forth. In an embodiment, the connector housing 210 may be detachably connected to the electromagnet 254. Power may be provided to the coil 272 via one or more wires (not shown) passing through the connector housing 210. The coil 272 may be energized in response to a signal from the electronic injection controller 128. A sealing element 282 (e.g., an O-ring) is also installed between the tube 276 and the first body 202. The sealing element 282 may prevent any leakage of the reagent and/or exhaust gases.

The pole piece 256 may be at least partly received within the electromagnet 254 and the connector housing 210. The pole piece 256 defines a bore 284 extending therethrough. In the illustrated embodiment, the bore 284 is a counterbore. The bore 284 is in fluid communication with a passage 286 of the reagent tube 240. Further, the reagent tube 240 is at least partly received within a wider portion of the bore 284 of the pole piece 256. A sealing member 287 is disposed between the second body 204 and the valve assembly 216. Specifically, the sealing member 287 is disposed between the reagent tube 240 and the pole piece 256. In another embodiment, the sealing member 287 may be disposed between the first body 202 and the second body 204. The sealing member 287 may be an O-ring. Further, the sealing member 287 is received in a groove 289 of the pole piece 256. In an alternative embodiment, the sealing member 287 may be received in a groove (not shown) of the reagent tube 240. The sealing member 287 may prevent leakage of the reagent from the injector 110. The second body 204 including the reagent tube 240 may be displaced from the first body 202 in response to expansion of the reagent during freezing. The spring member 206 may limit the axial movement of the second body 204. In a displaced state, as shown in FIG. 7, the reagent tube 240 and the pole piece 256 may define an expansion chamber 291 therebetween. The expansion chamber 291 may allow expansion of the reagent during freezing. The expansion chamber 291 may therefore act as a reservoir for the freezing reagent. Specifically, the expansion chamber 291 may act as a reservoir for ice formed due to freezing of the reagent. Since ice is allowed to expand, damage to various components of the injector 110 may be prevented. Further, the sealing member 287 may prevent any leakage of the reagent from the expansion chamber 291. A volume of the expansion chamber 291 may be optimized to allow adequate expansion of ice formed in the frozen condition of the reagent.

The inner tube 260 defines a tube bore 288 in fluid communication with the bore 284 of the pole piece 256. In an embodiment, the inner tube 260, the pole piece 256, and the reagent tube 240 may be coaxially aligned with each other. In an embodiment, the inner tube 260 may be made of a magnetic material (for example, 430 stainless steel) such that electrical energization of the coil 272 produces a magnetic field urging the inner tube 260 towards the pole piece 256.

The return spring 264 is received between respective shoulders of the pole piece 256 and the inner tube 260. Further, the inner tube 260 is enclosed within the outer tube 258. The outer tube 258 is at least partly received within the electromagnet 254 and the conduit portion 226 of the first body 202. The inner tube 260 further defines multiple tube holes 292. The tube holes 292 may be through holes defined on a wall of the inner tube 260. In an embodiment, the inner tube 260 may include two such tubes holes 292 that are located diametrically opposite to each other. The tube holes 292 may allow fluid communication between the tube bore 288 and a tube chamber 294. The tube chamber 294 may be at least partly defined by a bore of the outer tube 258.

The valve member 262 is connected to the inner tube 260 at one end. The valve member 262 may be connected to the inner tube 260 via various methods, such as welding, adhesives, interference fit, brazing, mechanical fasteners, and so forth. The valve member 262 may further include a flange that supports an end of the inner tube 260. The return spring 264 normally urges the inner tube 260 and the valve member 262 against a valve seat of the seat member 266. In a closed position, a plug portion of the valve member 262 rests on the valve seat and closes a seat aperture of the seat member 266. The plug portion may be disposed at an end of a valve stem of the valve member 262. Upon energization of the coil 272, the inner tube 260 may move towards the pole piece 256, thereby moving the valve member 262 away from the seat member 266. The plug portion of the valve member 262 is therefore displaced from the valve seat in an open position. In the open position, the reagent is allowed to flow through the seat aperture of the seat member 266.

The nozzle portion 268 may be located adjacent to the seat member 266. The nozzle portion 268 may atomize the reagent flowing therethrough. Therefore, the nozzle portion 268 may generate a spray of the reagent. The end member 270 may support the nozzle portion 268 within the outer tube 258. The end member 270 further defines a bore to allow the atomized reagent to flow therethrough. The reagent spray may exit through the outlet opening 228 of the first body 202 when the injector 110 is dispensing the reagent into the exhaust stream or flow of the engine 102 (shown in FIG. 1).

Figure 6:
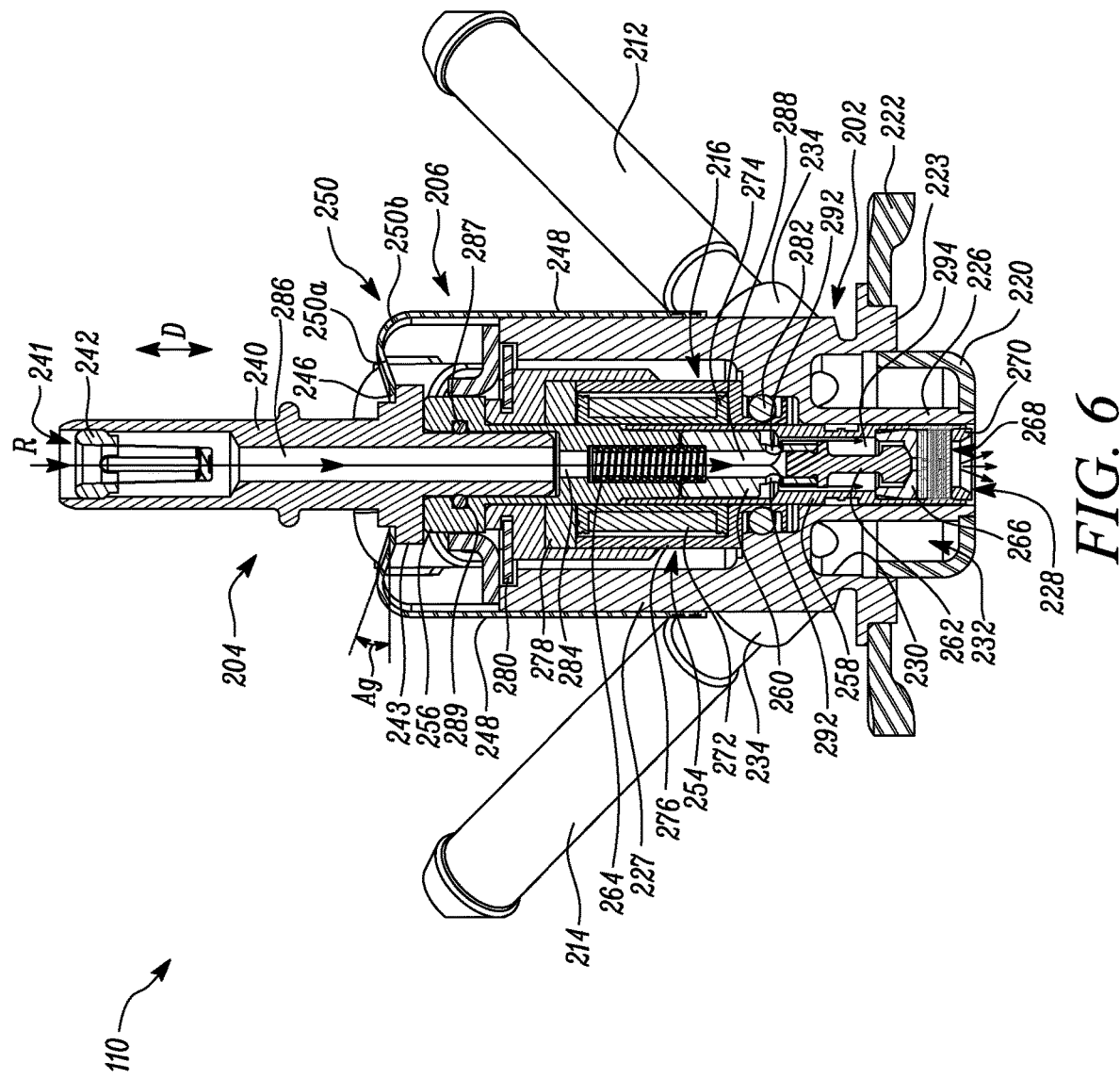
FIG. 6 is yet another sectional view of the reagent injector of FIG. 2.

During an operation of the injector 110, the reagent is received at the reagent inlet 241. An exemplary reagent flow path 'R' is shown in FIG. 6. The reagent flows through the inlet filter 242 and the passage 286 of the reagent tube 240. The reagent further flows into the bore 284 of the pole piece 256 and the tube bore 288 of the inner tube 260. The reagent may exit the inner tube 260 through the tube holes 290 and enters the tube chamber 294. In the closed position of the valve member 262, the plug portion of the valve member 262 may prevent the reagent from exiting the tube chamber 294. The return spring 264 urges the valve member 262 to the closed position. Upon energization of the coil 272, the inner tube 260 may be urged against the pole piece 256. The inner tube 260 may move the valve member 262 away from the seat member 266 against the biasing of the return spring 264. The plug portion of the valve member 262 may be therefore displaced from the valve seat of the seat member 266. In the open position of the valve member 262, the reagent may flow through the seat aperture of the seat member 266 into the nozzle portion 268. The reagent may be atomized by the nozzle portion 268. The atomized reagent may then exit the injector 110 through the bore of the end member 270 and the outlet opening 228 of the first body 202 in the form of a spray. The reagent spray may enter the exhaust stream of the engine 102 and enable selective catalytic reduction (SCR) of the NOx emissions in the exhaust stream upon passage through the SCR component 114. When injection of the reagent into the exhaust stream is not required, the coil 272 may be de-energized. The return spring 264 may move the valve member 262 to the closed position in the absence of any opposing electromagnetic force.

Figure 5:
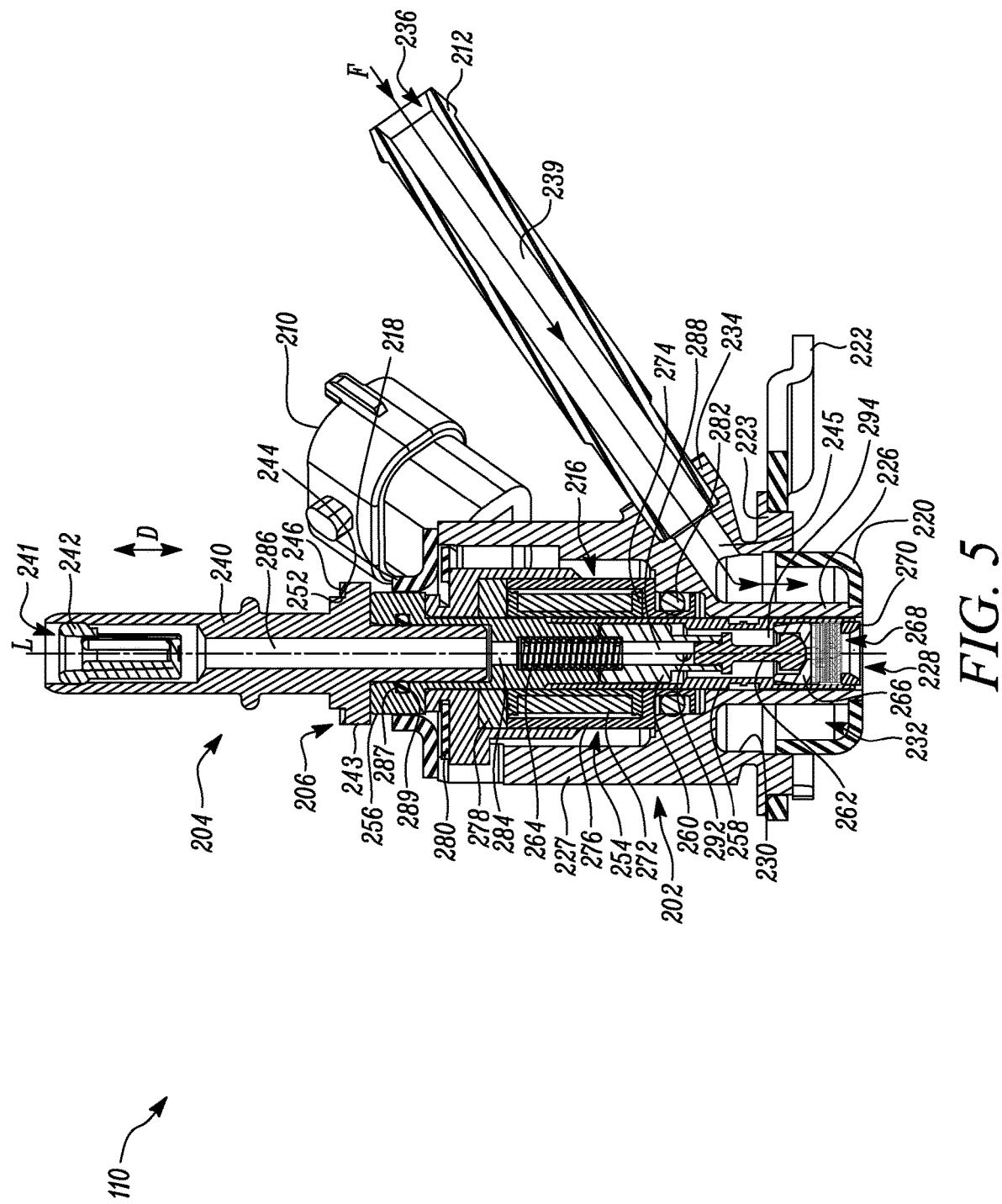
FIG. 5 is another sectional view of the reagent injector of FIG. 2.

The injector 110 may be cooled by the fluid received at the fluid inlet 236 of the fluid inlet tube 212, as indicated by the fluid flow path 'F' in FIG. 5. Further, the fluid in the fluid chamber 232 may exit the injector 110 through the fluid outlet tube 214. The fluid in the fluid chamber 232 may cool the conduit portion 226 of the first body 202. The volume of the fluid in the fluid chamber 232 may be optimized to provide efficient cooling. Therefore, one or more components of the valve assembly 216 that are at least partly received within the conduit portion 226 may be cooled. The reagent located in the tube chamber 294 may also be cooled. This may substantially prevent solidification of the reagent due to high temperatures of the exhaust system 100.

In a normal position of the second body 204, as illustrated in FIG. 6, the spring member 206 is pre-loaded to bias the second body 204 towards the first body 202. This may correspond to an unfrozen condition of the reagent. In the normal position, the flange section 243 of the second body 204 may be further disposed on an end of the pole piece 256. The reagent may expand in a frozen condition. In the illustrated embodiment, the injector 110 may be substantially rigid in a radial direction. Consequently, the reagent may expand along the axial direction 'D'. Further, the freezing reagent may apply the pressure 'P' on the second body 204 due to expansion, causing the second body 204 to be displaced along the axial direction 'D' away from the first body 202. The pressure 'P' may be exerted by expanding ice which is formed in the frozen condition of the reagent. The spring member 206 also deforms to allow the movement of the second body 204 along the axial direction 'D'. Specifically, the intermediate portions 250 of the spring member 206 may deform to allow the movement of the second body 204 relative to the first body 202. However, the biasing force 'Fb' applied by the spring member 206 may limit the movement of the second body 204 and retain the second body 204 at the distance 'D1' (shown in FIG. 7) from the end of the pole piece 256. This may correspond to an extended position or configuration of the second body 204. Therefore, the biasing force 'Fb' applied by the spring member 206 due to pre-loading may counteract the pressure 'P' applied by the reagent in the frozen condition. The expansion chamber 291 formed due to the movement of the second body 204 may also provide space for the reagent to expand during freezing. The sealing member 287 may prevent any leakage of the reagent from the injector 110. Upon subsequent thawing of the reagent, the reagent may contract. The pressure 'P' may no longer be applied on the second body 204. The spring member 206 may bias the second body 204 towards the first body 202 after ice has thawed. Specifically, the spring member 206 may displace the second body 204 and retain the second body 204 against the end of the pole piece 256.

The injector 110 may therefore include a freeze protection feature including the spring member 206 that allows the reagent to safely expand during freezing. Therefore, any damage to the injector 110 due to the freezing reagent may be substantially prevented. Any leakage of the reagent may also be prevented by the sealing member 287. After the reagent has thawed, the spring member 206 further moves the second body 204 to its normal position.

FIGS. 8 to 11 illustrate an injector 400, in accordance with another aspect of the present disclosure. The injector 400 may be provided for injecting a reagent into the exhaust stream of the engine 102 (shown in FIG. 1). The injector 400 includes a first injector body 402 (hereinafter referred to as "the first body 402"), a second injector body 404 (hereinafter referred to as "the second body 404"), a spring member 406, a reagent outlet tube 408, an electrical connector housing 410 (hereinafter referred to as "the connector housing 410"), and a valve assembly 412. The injector 400 may define a longitudinal axis 'L1' extending along a length of the injector 400.

The first body 402 may be substantially hollow and at least partially encloses the valve assembly 412. Further, the first body 402 includes an upper portion 414 and a lower portion 416. The upper portion 414 may be open at a top end. A top cap 418 may at least partly cover the top end of the upper portion 414. The upper portion 414 may have a substantially cylindrical shape. Further, the lower portion 416 may have a tapered shape. The first body 402 further includes a mounting flange 422. In the illustrated embodiment, the mounting flange 422 is integral with the first body 402. The mounting flange 422 defines multiple flange apertures 424. The flange apertures 424 enable the mounting flange 422 to be mounted on the exhaust conduit 106 (shown in FIG. 1) via mechanical fasteners, such as bolts.

The lower portion 416 defines an outlet opening 428 for discharge of the reagent into the exhaust stream. The upper portion 414 of the first body 402 includes a connector opening 429 for receiving the connector housing 410 therethrough. The first body 402 further includes a receiving portion 434 for at least partly receiving the reagent outlet tube 408. The receiving portion 434 may be inclined with respect to the longitudinal axis 'L1' of the injector 400. Therefore, the reagent outlet tube 408 may also be inclined with respect to the longitudinal axis 'L1'. The reagent outlet tube 408 may be connected to the first body 402 via various methods, such as welding, brazing, adhesives, mechanical fasteners, interference fit, and so forth. In an embodiment, the reagent outlet tube 408 may be detachably connected to the first body 402. The reagent outlet tube 408 further includes a flange section 910 disposed thereon. The flange section 910 includes an upper surface 911.

The reagent outlet tube 408 may be a hollow tube that allows the reagent to flow therethrough. The reagent outlet tube 408 defines a reagent outlet 436 disposed in fluid communication with a reagent chamber 438 of the first body 402. Further, the reagent outlet 436 is spaced apart from the exhaust conduit 106 (shown in FIG. 1) with the reagent chamber 438 between them. In the illustrated embodiment, the reagent outlet 436 may be an orifice that controls a discharge of the reagent from the reagent outlet tube 408. The reagent chamber 438 may be defined by the lower portion 416. A flow passage 437 (shown in FIG. 9) of the reagent outlet tube 408 may be in fluid communication with an inclined bore 439 of the first body 402. The inclined bore 439 may be in fluid communication with the reagent chamber 438. Further, the reagent outlet 436 may discharge the fluid to a return line (not shown) that is connected to the reagent tank 120 (shown in FIG. 1). The reagent in the reagent chamber 438 may at least partially surround one or more components of the valve assembly 412 and provide cooling to the one or more components. Further, a volume of the reagent in the reagent chamber 438 may be optimized to provide efficient cooling of the one or more components of the valve assembly 412.

The second body 404 includes a reagent tube 440. The reagent tube 440 may be oriented substantially parallel to the longitudinal axis 'L1'. Further, the reagent tube 440 may be substantially hollow with open ends. The reagent tube 440 may receive the reagent from the pump 122 (shown in FIG. 1) via the supply line 124. The reagent tube 440 further receives the reagent at a reagent inlet 441. The reagent tube 440 includes an inlet filter 442 through which the reagent passes. The second body 404 further includes a flange section 443 extending from the reagent tube 440. The flange section 443 includes an upper surface 444. The reagent inlet and outlet configuration, as illustrated in FIGS. 8-11, is exemplary in nature, and alternative configurations are possible within the scope of the present disclosure. For example, the reagent tube 440 may include a reagent outlet, while the tube 408 may include a reagent inlet.

In an embodiment, the second body 404 may be movable with respect to the first body 402. Further, the second body 404 may be movable along an axial direction 'Da' that is substantially parallel to the longitudinal axis 'L1' of the injector 400. The spring member 406 is positioned between the first body 402 and the second body 404. Further, the spring member 406 may movably connect the second body 404 to the first body 402. In an embodiment, the spring member 406 may be a substantially flat spring. Further, the spring member 406 may be formed by at least one stamping or molding process. In a further embodiment, the spring member 406 may be made of a metal or a metal alloy. The spring member 406 includes a main portion 446, at least one elongate portion 448, and at least one intermediate portion 450 disposed between the main portion 446 and the at least one elongate portion 448. In the illustrated embodiment, the spring member 406 includes a pair of elongate portions 448 and a pair of intermediate portions 450. In an alternative embodiment, each of the pair of elongate portions 448 may have a zig-zag shape to provide additional travel of the second body 404. Each of the pair of intermediate portions 450 is disposed between the main portion 446 and a corresponding elongate portion 448. The main portion 446 is disposed on the flange section 443 of the reagent tube 440. Further, the main portion 446 is pressed against the upper surface 444 of the flange section 443. In another embodiment, the main portion 446 may be connected to a substantially circular area of the flange section 443 of the reagent tube 440. The main portion 446 may have an annular shape defining a main aperture 452. Though in the illustrated embodiment, the main aperture 452 has a substantially circular shape, other shapes of the main aperture 452 may be contemplated within the scope of the present disclosure. Such shapes of the main aperture 452 may include polygonal, elliptical, etc. The main aperture 452 is at least partially arranged around the reagent tube 440. The main aperture 452 therefore allows the reagent tube 440 to extend therethrough. In an embodiment, the main portion 446 may be press-fitted on the flange section 443 of the second body 404. In other embodiments, the main portion 446 may be attached to the second body 404 by various methods, such as welding, brazing, adhesives, mechanical fasteners, and so forth. In another embodiment, the main portion 446 may be detachably connected to the second body 404.

The intermediate portions 450 may extend from diametrically opposite sides of the main portion 446. In an undeformed or normal state, each of the intermediate portions 450 has a curvilinear shape that extends upwards from the main portion 446 and then curves downwards towards the respective elongate portion 448. Specifically, each intermediate portion 450 includes a first section 450a that extends upwards from the main portion 446, and a second section 450b that curves downwards and meets the respective elongate portion 448. In an embodiment, the first section 450a may have a substantially planar shape. The first section 450a is further inclined at an angle 'Ah' (shown in FIG. 10) with respect to the main portion 446 in the undeformed state or configuration. The second section 450b has a curved shape and connects the first section 450a to the respective elongate portion 448. Each intermediate portion 450 is adapted to deform to allow movement of the second body 404 relative to the first body 402. Specifically, each intermediate portion 450 deforms to allow movement of the second body 404 away from the first body 402 along the axial direction 'Da'. In the deformed state or configuration, as shown in FIG. 11, the first section 450a is oriented substantially parallel to the main portion 446, i.e., an angle between them is substantially zero. After each intermediate portion 450 is deformed or flexed to a point where the first section 450a is oriented substantially parallel to the main portion 446, the spring member 406 may limit the maximum axial movement of the second body 404 relative to the first body 402. A distance 'D2' (shown in FIG. 11) may correspond to the maximum axial movement of the second body 404 relative to the first body 402. The distance 'D2' may be the distance between the second body 404 and the pole piece 456.

Each elongate portion 448 includes a substantially planar shape. In an embodiment, each elongate portion 448 is connected to the first body 402 by welding. In other embodiments, each elongate portion 448 may be connected to the first body 402 by various methods, such as brazing, mechanical fasteners, adhesives, and so forth. In another embodiment, each elongate portion 448 may be detachably connected to the first body 402 by any non-permanent joining method. Such a detachable connection may enable the second body 404 to be removed from the first body 402, thereby allowing servicing and/or replacement of one or more internal components (e.g., the valve assembly 412) of the injector 400. In a further embodiment, each elongate portion 448 may be connected to the first body 402 by a snap-fit connection.

In an embodiment, the spring member 406 is pre-loaded to bias the second body 404 towards the first body 402. In another embodiment, the spring member 406 is further configured to bias or push the valve assembly 412 towards the first body 402. The second body 404 may move against the biasing of the spring member 406 in response to expansion of the reagent during freezing. The spring member 406 is further configured to limit a maximum movement of the second body 404, relative to the first body 402, in response to expansion of the reagent during freezing. Specifically, the spring member 406 may apply a biasing force 'Fs' against a pressure 'Pa' exerted by the reagent during freezing. The reagent may expand in a frozen condition due to the formation of ice. Expansion of the reagent is therefore due to expansion of ice. The pressure 'Pa' is exerted by ice that is formed due to freezing of the reagent. In an embodiment, the limit to the movement of the second body 404 may be an end stop.

The valve assembly 412 (shown in FIGS. 9 to 11) includes an electromagnet 454, a pole piece 456, an outer tube 458, an inner tube 460, a valve member 462, a return spring 464, a seat member 466, a nozzle portion 468, and an end member 470. In an embodiment, the valve assembly 412 may be a removable or replaceable cartridge assembly. The valve assembly 412 can therefore be removed from the injector 400 and replaced with another valve assembly, if required. The valve assembly 412 is configured to selectively dispense the reagent through the outlet opening 428 of the first body 402. The electromagnet 454 includes a coil 472, a bobbin 474, a tube 476, and an end cap 478. The electromagnet 454 may be disposed within the first body 402. The structures and functionalities of the various components of the valve assembly 412 and the electromagnet 454 are mostly similar to those of the valve assembly 216 and the electromagnet 254, respectively, described above with reference to FIGS. 2-7. Therefore, some of the details of the valve assembly 412 and the electromagnet 454 will be omitted in the present disclosure.

A retaining ring 480 may retain and/or support the connector housing 410 within the first housing 402. A sealing element 482 (e.g., an O-ring) is also installed between the tube 476 and the first body 402. The sealing element 482 may prevent any leakage of the reagent. The pole piece 456 defines a bore 484 extending therethrough. The bore 484 is in fluid communication with a passage 486 of the reagent tube 440. Further, the reagent tube 440 is at least partly received within the bore 484 of the pole piece 456.

A sealing member 487 is disposed between the second body 404 and the valve assembly 412. Specifically, the sealing member 487 is disposed between the reagent tube 440 and the pole piece 456. In an alternative embodiment, the sealing member 487 may be disposed between the first body 402 and the second body 404. The sealing member 487 may be an O-ring. Further, the sealing member 487 is received in a groove 489 of the reagent tube 440. The sealing member 487 may prevent leakage of the reagent from the injector 400.

The second body 404 including the reagent tube 440 may be displaced from the first body 402 in response to expansion of the reagent during freezing. The spring member 406 may limit the axial movement of the second body 404. In a displaced state, as shown in FIG. 11, the reagent tube 440 and the pole piece 456 may define an expansion chamber 491 therebetween. The expansion chamber 491 may allow expansion of the reagent during freezing. The expansion chamber 491 may therefore act as a reservoir for the freezing reagent. Specifically, the expansion chamber 491 may act as a reservoir for ice formed due to freezing of the reagent. Since ice is allowed to expand, damage to various components of the injector 400 may be prevented. Further, the sealing member 487 may prevent any leakage of the reagent from the expansion chamber 491. A volume of the expansion chamber 491 may be optimized to allow adequate expansion of ice formed in the frozen condition of the reagent.

The inner tube 460 defines a tube bore 488 in fluid communication with the bore 484 of the pole piece 456. In an embodiment, the inner tube 460, the pole piece 456, and the reagent tube 440 may be coaxially aligned with each other. The return spring 464 is received between respective shoulders of the pole piece 456 and the inner tube 460. Further, the inner tube 460 is enclosed within the outer tube 458. The outer tube 458 is at least partly received within the electromagnet 454 and the lower portion 416 of the first body 402. The inner tube 460 further defines multiple tube holes 492. The tube holes 492 may allow fluid communication between the tube bore 488 and a tube chamber 494. The tube chamber 494 may be at least partly defined by a bore of the outer tube 458. The outer tube 458 further includes a hole 496 that fluidly communicates the tube chamber 494 of the outer tube 458 with the reagent chamber 438 of the first body 402. The reagent in the reagent chamber 438 may cool one or more components of the valve assembly 412.

The valve member 462 is connected to the inner tube 460 at one end. The return spring 464 normally urges the inner tube 460 and the valve member 462 against a valve seat of the seat member 466. In a closed position, a plug portion of the valve member 462 rests on the valve seat and closes a seat aperture of the seat member 466. Upon energization of the coil 472, the inner tube 460 may move towards the pole piece 456, thereby moving the valve member 462 away from the seat member 466. The plug portion of the valve member 462 is therefore displaced from the valve seat in an open position. In the open position, the reagent is allowed to flow through the seat aperture of the seat member 466.

The nozzle portion 468 may be located adjacent to the seat member 466. The nozzle portion 468 may atomize the reagent flowing therethrough. The end member 470 may support the nozzle portion 468 within the outer tube 458. The end member 470 further defines a bore to allow the atomized reagent to flow therethrough. The reagent spray may exit through the outlet opening 428 of the first body 402 when the injector 400 is dispensing the reagent into the exhaust stream or flow of the engine 102 (shown in FIG. 1).

Figure 9:
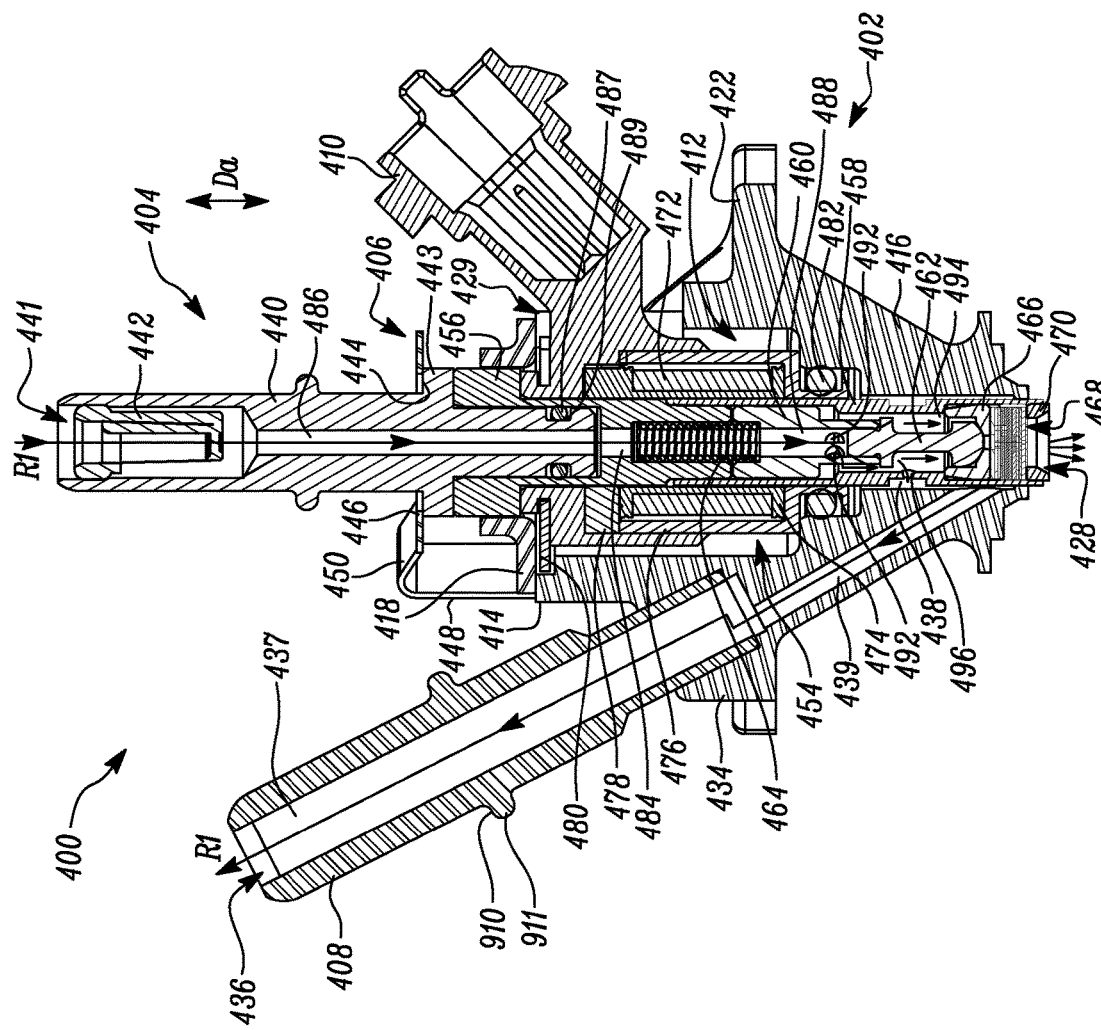
FIG. 9 is a sectional view of the reagent injector of FIG. 8.

During an operation of the injector 400, the reagent is received at the reagent inlet 441. An exemplary reagent flow path 'R1' is shown in FIG. 9. The reagent flows through the inlet filter 442 and the passage 486 of the reagent tube 440. The reagent further flows into the bore 484 of the pole piece 456 and the tube bore 488 of the inner tube 460. The reagent may exit the inner tube 460 through the tube holes 490 and enters the tube chamber 494. In the closed position of the valve member 462, the plug portion of the valve member 462 may prevent the reagent from exiting the tube chamber 494. The return spring 464 urges the valve member 462 to the closed position. Upon energization of the coil 472, the inner tube 460 may be urged against the pole piece 456. The inner tube 460 may move the valve member 462 away from the seat member 466 against the biasing of the return spring 464. The plug portion of the valve member 462 may be therefore displaced from the valve seat of the seat member 466. In the open position of the valve member 462, the reagent may flow through the seat aperture of the seat member 466 into the nozzle portion 468. The reagent may be atomized by the nozzle portion 468. The atomized reagent may then exit the injector 400 through the bore of the end member 470 and the outlet opening 428 of the first body 402 in the form of a spray. The reagent spray may enter the exhaust stream of the engine 102 and enable selective catalytic reduction (SCR) of the NOx emissions in the exhaust stream upon passage through the SCR component 114. When injection of the reagent into the exhaust stream is not required, the coil 472 may be de-energized. The return spring 464 may move the valve member 462 to the closed position in the absence of any opposing electromagnetic force.

As indicated by the reagent flow path 'R1', the reagent in the tube chamber 494 may flow through the hole 496 into the reagent chamber 438. The reagent in the reagent chamber 438 may cool one or more components of the valve assembly 412. A shape and/or dimensions of the hole 496 may be chosen as per cooling requirements of the valve assembly 412. The volume of the reagent in the reagent chamber 438 may also be optimized to provide efficient cooling.

Figure 10:
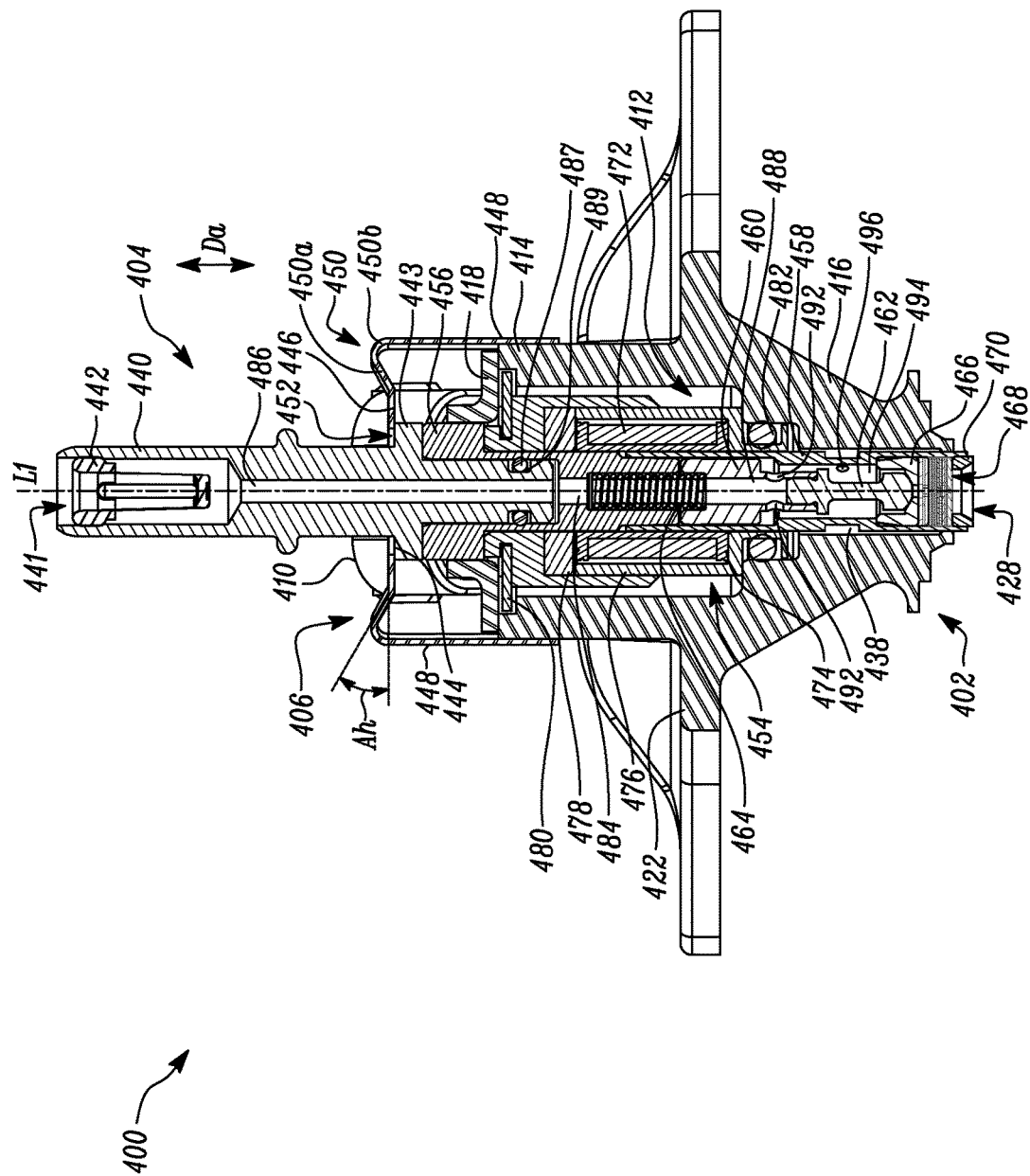
FIG. 10 is another sectional view of the reagent injector of FIG. 8.
Figure 11:
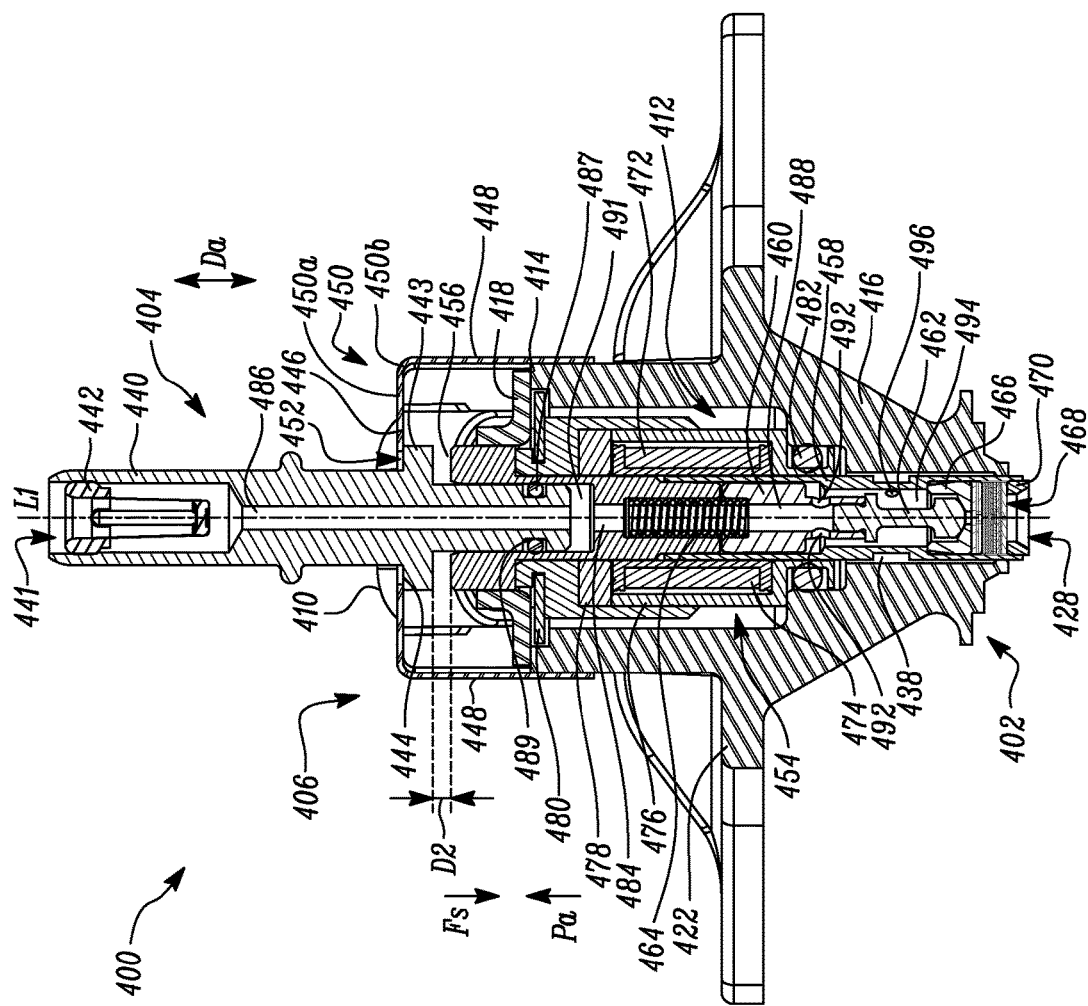
FIG. 11 is a sectional view of the reagent injector of FIG. 8 in an extended configuration, according to an aspect of the present disclosure.

In a normal position of the second body 404, as illustrated in FIG. 10, the spring member 406 is pre-loaded to bias the second body 404 towards the first body 402. This may correspond to an unfrozen condition of the reagent. In the normal position, the flange section 443 of the second body 404 may be further disposed on an end of the pole piece 456. The reagent may expand in a frozen condition. In the illustrated embodiment, the injector 400 may be substantially rigid in a radial direction. Consequently, the reagent may expand along the axial direction 'Da'. Further, the freezing reagent may apply the pressure 'Pa' on the second body 404 due to expansion, causing the second body 404 to be displaced along the axial direction 'Da' away from the first body 402. The pressure 'Pa' may be exerted by expanding ice which is formed in the frozen condition of the reagent. The spring member 406 also deforms to allow the movement of the second body 404 along the axial direction 'Da'. Specifically, the intermediate portions 450 of the spring member 406 may deform to allow the movement of the second body 404 relative to the first body 402. However, the biasing force 'Fs' applied by the spring member 406 may limit the movement of the second body 404 and retain the second body 404 at the distance 'D2' (shown in FIG. 11) from the end of the pole piece 456. This may correspond to an extended position or configuration of the second body 404. Therefore, the biasing force 'Fs' applied by the spring member 406 due to pre-loading may counteract the pressure 'Pa' applied by the reagent in the frozen condition. The expansion chamber 491 formed due to the movement of the second body 404 may also provide space for the reagent to expand during freezing. The sealing member 487 may prevent any leakage of the reagent from the injector 400. Upon subsequent thawing of the reagent, the reagent may contract. The pressure 'Pa' may no longer be applied on the second body 404. The spring member 406 may bias the second body 404 towards the first body 402 after ice has thawed. Specifically, the spring member 406 may displace the second body 404 and retain the second body 404 against the end of the pole piece 456.

The injector 400 may therefore include a freeze protection feature including the spring member 406 that allows the reagent to safely expand during freezing. Therefore, any damage to the injector 400 due to the freezing reagent may be substantially prevented. Any leakage of the reagent may also be prevented by the sealing member 487. After the reagent has thawed, the spring member 406 further moves the second body 404 to its normal position.

The injector 400, as illustrated in FIGS. 8-11, is purely exemplary in nature, and alternative configurations are possible within the scope of the present disclosure. For example, instead of the second body 404, the reagent outlet tube 408 may be movable with respect to the first body 402. Further, a spring member (not shown) may bias the reagent outlet tube 408 towards the first body 402. The spring member may also limit the movement of the reagent outlet tube 408 in response to expansion of the reagent during freezing. The spring member may further move the reagent outlet tube 408 to a normal position when the reagent has thawed. As such, the present disclosure is not limited to a movement in the axial direction 'Da' of the injector 400 to allow expansion of the reagent in frozen condition. Instead, the movement may be oriented at any angle relative to the longitudinal axis 'L1'.

In another embodiment, both the second body 404 and the reagent outlet tube 408 may be movable with respect to first body 402. The injector 400 may then include two spring members. One spring member may be used on the second body 404, while the other spring member may be used on the reagent outlet tube 408.

Figure 12:
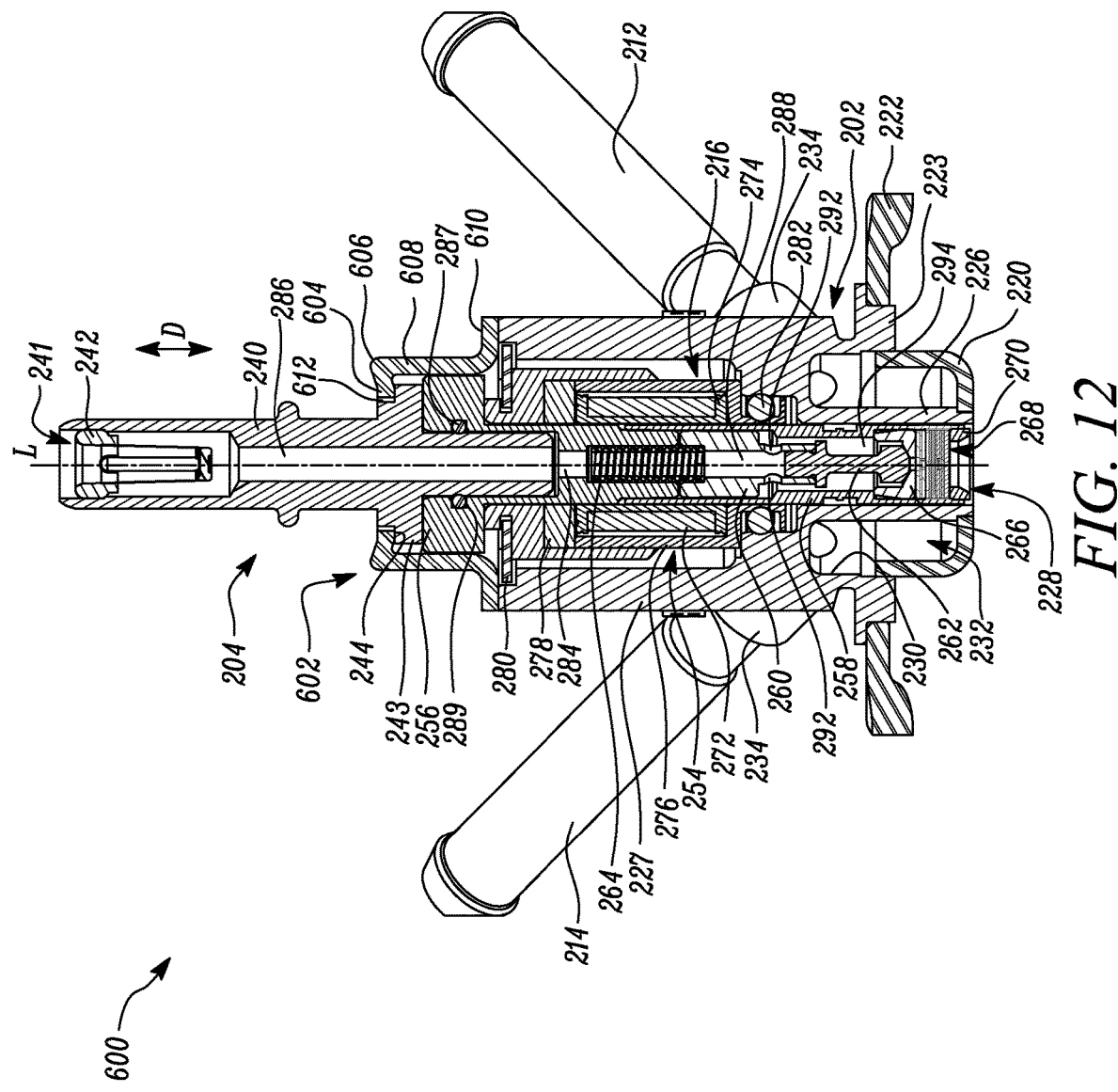
FIG. 12 is a sectional view of a reagent injector, according to another aspect of the present disclosure.
Figure 13:
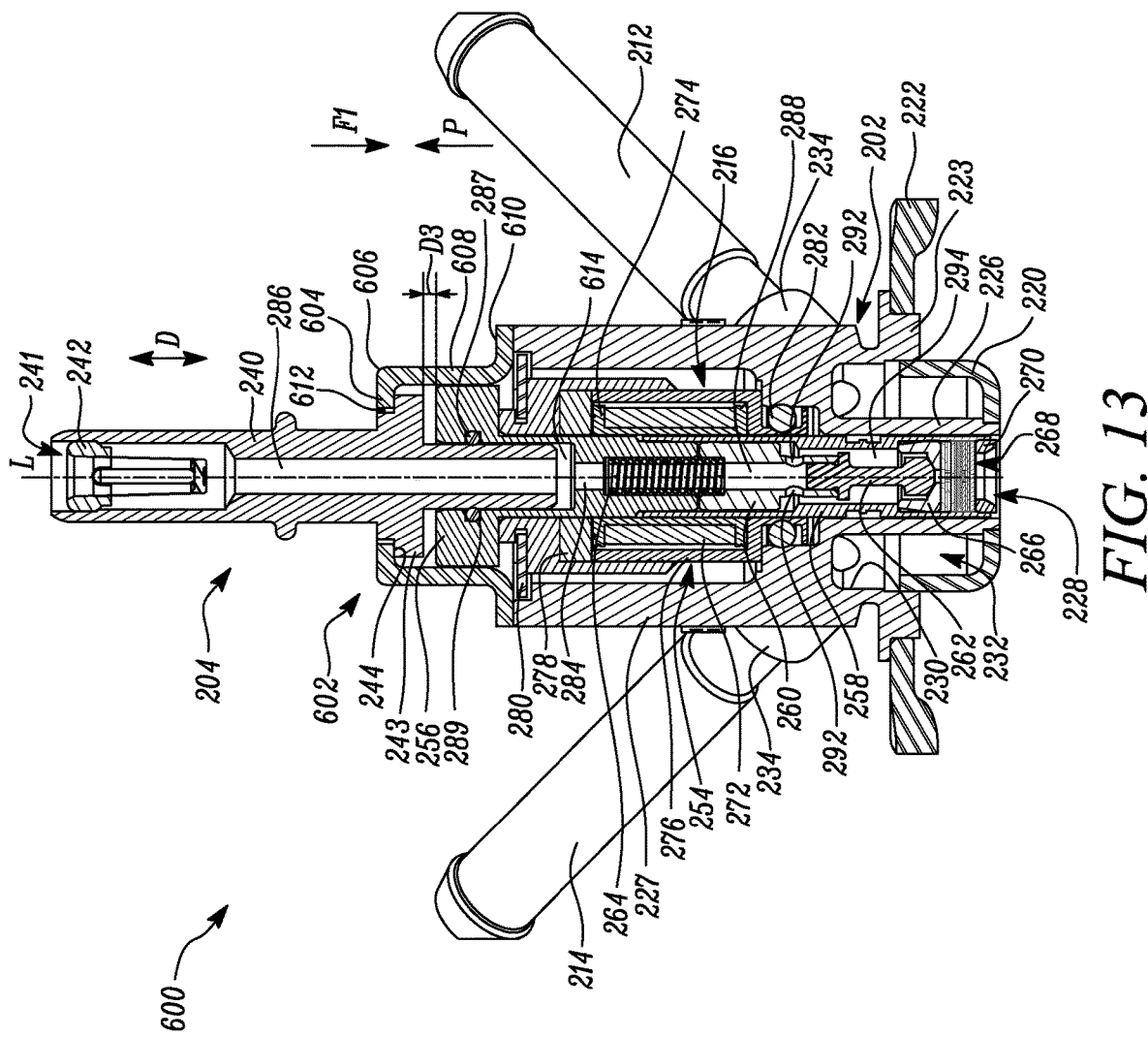
FIG. 13 is a sectional view of the reagent injector of FIG. 12 in an extended configuration, according to an aspect of the present disclosure.

FIGS. 12 and 13 illustrate sectional views of an injector 600, in accordance with another aspect of the present disclosure. The injector 600 is substantially similar in structure and function to the injector 110 described above with reference to FIGS. 2-7. Similar components have therefore been provided with similar reference numerals. However, a spring member 602 of the injector 600 may also act as a top cap for the first body 202. Specifically, the spring member 602 may retain various parts of the valve assembly 216 within the first body 202. The spring member 602 is positioned between the first body 202 and the second body 204. The spring member 602 may also movably connect the second body 204 to the first body 202. In an embodiment, the spring member 602 may be a generally flat spring. Further, the spring member 602 may be formed by at least one stamping or molding process. In a further embodiment, the spring member 602 may be made of a metal or a metal alloy. The spring member 602 includes at least one main portion 604, at least one intermediate portion 606, at least one elongate portion 608, and at least one cap portion 610. In an embodiment, the spring member 602 may have a substantially axisymmetric configuration. Specifically, the spring member 602 may be substantially symmetric about the longitudinal axis 'L' of the injector 600. In alternative embodiments, the spring member 602 may have a pair of intermediate portions 606 extending from the main portion 604 and a pair of elongate portions 608 extending from respective intermediate portions 606. In another embodiment, the spring member 602 may have multiple intermediate portions 606 with each intermediate portion 606 extending from a separate main portion (not shown). Further, each of the elongate portions 608 may extend from a corresponding intermediate portion 606. Therefore, the intermediate portions 606 and the elongate portions 608 are not connected to each other. The intermediate portions 606 and the elongate portions 608 can be flexed or deformed away from each other, thereby allowing servicing and/or replacement of one or more internal components (e.g., the valve assembly 216) of the injector 600.

The main portion 604 is disposed on the flange section 243 of the reagent tube 240. Further, the main portion 604 is pressed against the upper surface 244 of the flange section 243. The upper surface 244 may include a lip contour so that the main portion 604 snaps or clips onto the second body 204. This may also prevent a rotation of the second body 204. In another embodiment, the main portion 604 may be connected to a substantially circular area of the flange section 243 of the reagent tube 240. The main portion 604 may have an annular shape defining a main aperture 612. The main aperture 612 is at least partially arranged around the reagent tube 240. In an alternative embodiment, the main portion 604 may not include a fully enclosed aperture. For example, the main aperture 612 may be substantially U-shaped. The main aperture 612 therefore allows the reagent tube 240 to extend therethrough. In an embodiment, the main portion 604 may be press-fitted on the flange section 243 of the second body 204. In other embodiments, the main portion 604 may be attached to the second body 204 by various methods, such as welding, brazing, adhesives, mechanical fasteners, and so forth. In another embodiment, the main portion 604 may be detachably connected to the second body 204.

The intermediate portion 606 may extend from the main portion 604. In another embodiment, the main portion 604 may be an end or an extension of the intermediate portion 606 that is in contact with the second body 204. In an undeformed or normal state, as shown in FIG. 12, the intermediate portion 606 has a curvilinear shape that extends upwards from the main portion 604 and then curves downwards towards the elongate portion 608. In a deformed state or configuration, as shown in FIG. 13, a part of the intermediate portion 606 is oriented substantially parallel to the main portion 604. After the intermediate portion 606 is deformed or flexed to a point where the part of the intermediate portion 606 is oriented substantially parallel to the main portion 604, the spring member 602 may limit the maximum axial movement of the second body 204 relative to the first body 202. A distance 'D3' (shown in FIG. 13) may correspond to the maximum axial movement of the second body 204 relative to the first body 202. The distance 'D3' may be the distance between the second body 204 and the pole piece 256.

The elongate portion 608 extends from the intermediate portion 606. The intermediate portion 606 may therefore be disposed between the main portion 604 and the elongate portion 608. Further, the elongate portion 608 may be connected to the pole piece 256. In an embodiment, the elongate portion 608 is connected to the pole piece 256 by welding. In other embodiments, the elongate portion 608 may be connected to the pole piece 256 by various methods, such as brazing, mechanical fasteners, adhesives, and so forth. In another embodiment, the elongate portion 608 may be detachably connected to the pole piece 256 by any non-permanent joining method. Such a detachable connection may enable the second body 204 to be removed from the first body 202, thereby allowing servicing and/or replacement of one or more internal components (e.g., the valve assembly 216) of the injector 600. In a further embodiment, the elongate portion 608 may be connected to the pole piece 256 by a snap-fit connection.

The cap portion 610 extends from the elongate portion 608 and is oriented substantially normal to the longitudinal axis 'L' of the injector 600. The elongate portion 608 may therefore be disposed between the intermediate portion 606 and the cap portion 610. The cap portion 610 at least partially covers the top end of the first body 202. In an embodiment, the cap portion 610 is connected to the first body 202 by welding. In other embodiments, the cap portion 610 may be connected to the first body 202 by various methods, such as brazing, mechanical fasteners, adhesives, and so forth. In another embodiment, the cap portion 610 may be detachably connected to the first body 202 by any non-permanent joining method. Such a detachable connection may enable the second body 204 to be removed from the first body 202, thereby allowing servicing and/or replacement of one or more internal components (e.g., the valve assembly 216) of the injector 600. In a further embodiment, the cap portion 610 may be connected to the first body 202 by a snap-fit connection.

In an embodiment, the spring member 602 is pre-loaded to bias the second body 204 towards the first body 202. In another embodiment, the spring member 602 is further configured to bias or push the valve assembly 216 towards the first body 202. The second body 204 may move against the biasing of the spring member 602 in response to expansion of the reagent during freezing. The spring member 602 is further configured to limit a maximum movement of the second body 204, relative to the first body 202, in response to expansion of the reagent during freezing. Specifically, the spring member 602 may apply a biasing force 'F1' against the pressure 'P' exerted by the reagent during freezing. The reagent may expand in a frozen condition due to the formation of ice. Expansion of the reagent is therefore caused by expansion of ice. The pressure 'P' is exerted by ice that is formed due to freezing of the reagent. The spring member 602 may be further configured to at least partially cover the top end of the first body 202.

The second body 204 including the reagent tube 240 may be axially displaced from the first body 202 in response to expansion of the reagent during freezing. The spring member 602 may limit a maximum axial movement of the second body 204. In a displaced state, as shown in FIG. 13, the reagent tube 240 and the pole piece 256 may define an expansion chamber 614 therebetween. The expansion chamber 614 may allow expansion of the reagent during freezing. The expansion chamber 614 may therefore act as a reservoir for the freezing reagent. Specifically, the expansion chamber 614 may act as a reservoir for ice formed due to freezing of the reagent. Since ice is allowed to expand, damage to various components of the injector 600 may be prevented. Further, the sealing member 287 may prevent any leakage of the reagent from the expansion chamber 614. A volume of the expansion chamber 614 may be optimized to allow adequate expansion of ice formed in the frozen condition of the reagent.

In a normal position of the second body 204, as illustrated in FIG. 12, the spring member 602 is pre-loaded to bias the second body 204 towards the first body 202. This may correspond to an unfrozen condition of the reagent. In the normal position, the flange section 243 of the second body 204 may be further disposed on an end of the pole piece 256. The reagent may expand in a frozen condition. In the illustrated embodiment, the injector 600 may be substantially rigid in a radial direction. Consequently, the reagent may expand along the axial direction 'D'. Further, the freezing reagent may apply the pressure 'P' on the second body 204 due to expansion, causing the second body 204 to be displaced along the axial direction 'D' away from the first body 202. The pressure 'P' may be exerted by expanding ice which is formed in the frozen condition of the reagent. The spring member 602 also deforms to allow the movement of the second body 204 along the axial direction 'D'. Specifically, the intermediate portion 606 of the spring member 602 may deform to allow the movement of the second body 204 relative to the first body 202. However, the biasing force 'F1' applied by the spring member 602 may limit the maximum movement of the second body 204 and retain the second body 204 at the distance 'D3' (shown in FIG. 13) from the end of the pole piece 256. This may correspond to an extended position or configuration of the second body 204. Therefore, the biasing force 'F1' applied by the spring member 602 due to pre-loading may counteract the pressure 'P' applied by the reagent in the frozen condition. The expansion chamber 614 formed due to the movement of the second body 204 may also provide space for the reagent to expand during freezing. The sealing member 287 may prevent any leakage of the reagent from the injector 600. Upon subsequent thawing of the reagent, the reagent may contract. The pressure 'P' may no longer be applied on the second body 204. The spring member 602 may bias the second body 204 towards the first body 202 after ice has thawed. Specifically, the spring member 602 may displace the second body 204 and retain the second body 204 against the end of the pole piece 256.

The injector 600 may therefore include a freeze protection feature including the spring member 602 that allows the reagent to safely expand during freezing. Therefore, any damage to the injector 600 due to the freezing reagent may be substantially prevented. Any leakage of the reagent may also be prevented by the sealing member 287. After the reagent has thawed, the spring member 602 further moves the second body 204 to its normal position. The spring member 602 may additionally function as a top cap for the first body 202.

Figure 14:
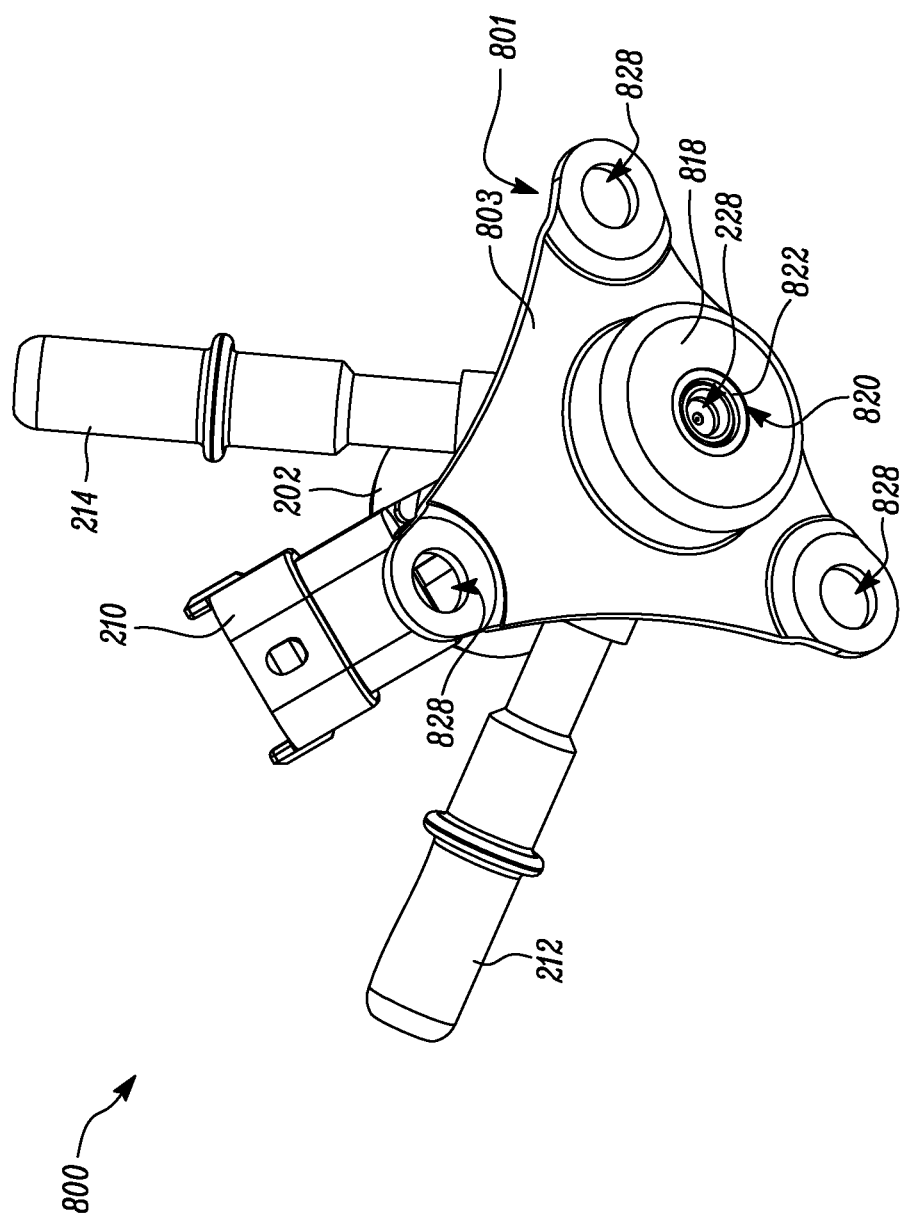
FIG. 14 is a perspective view of a reagent injector, according to another aspect of the present disclosure.
Figure 15:
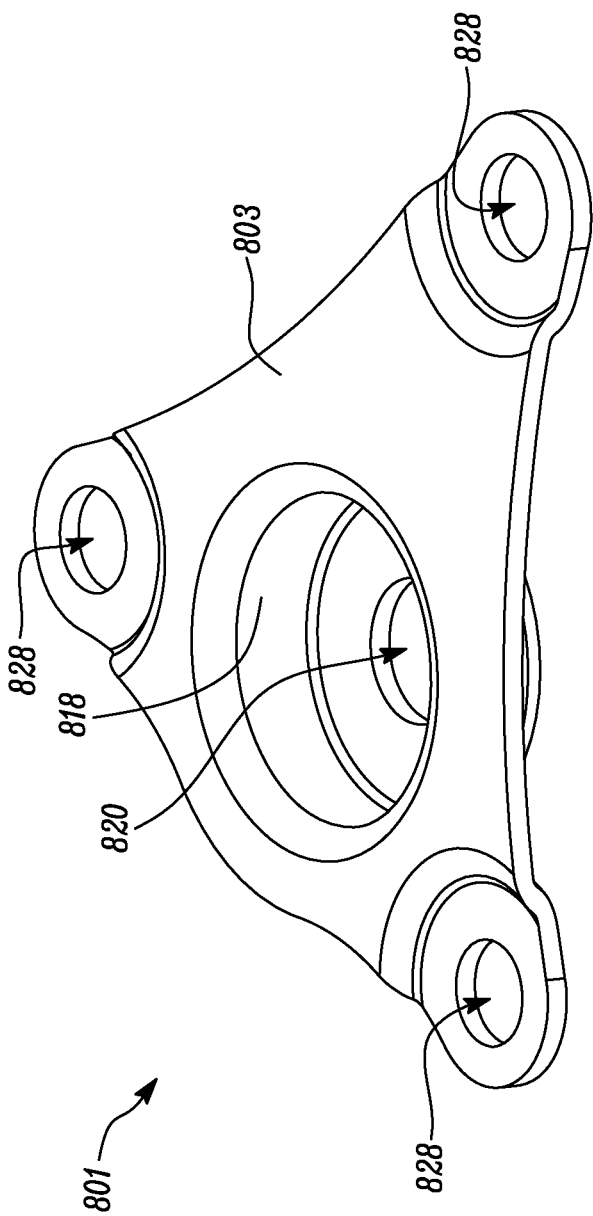
FIG. 15 is a perspective view of a cover member of the reagent injector, according to another aspect of the present disclosure.
Figure 16:
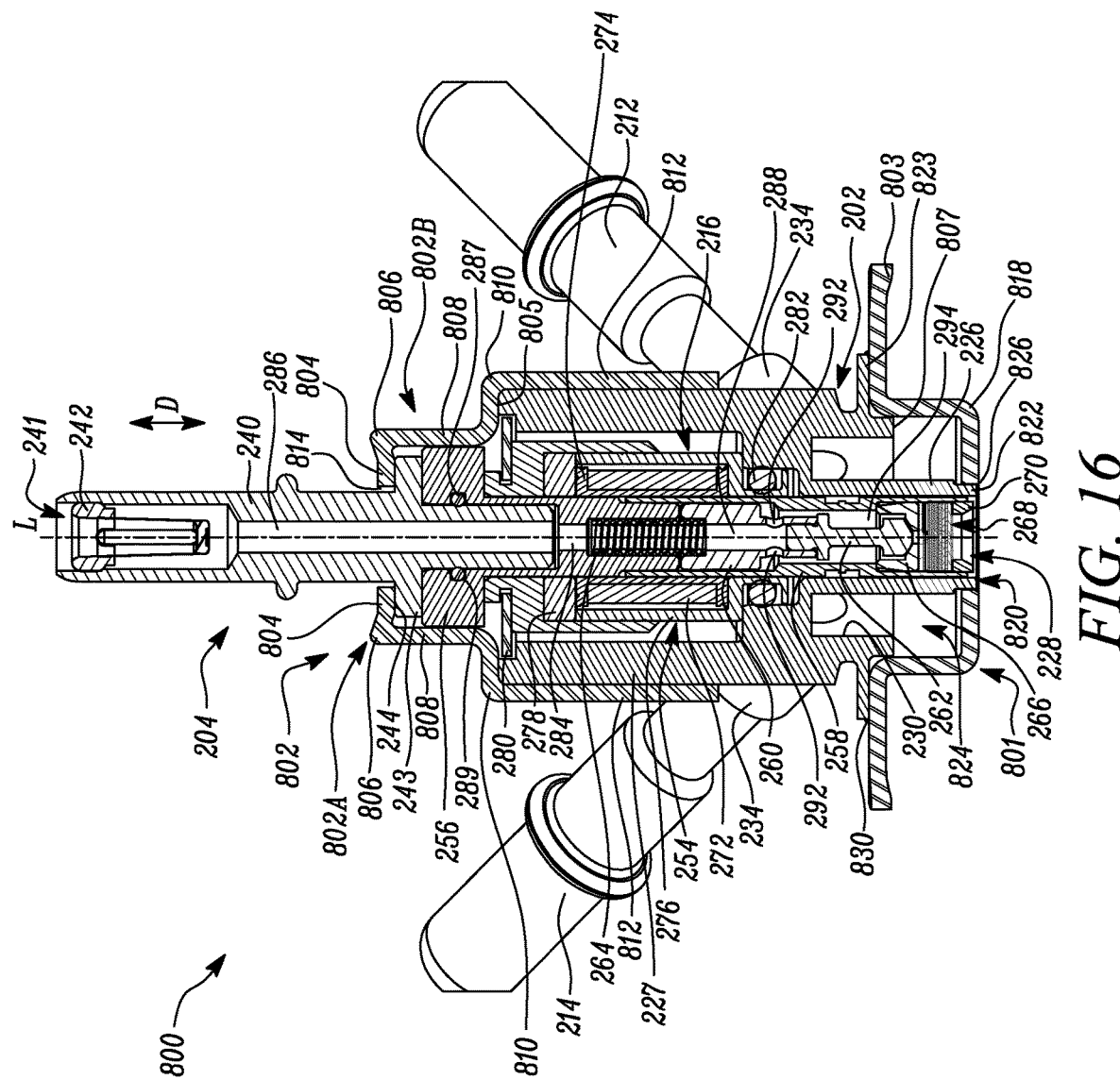
FIG. 16 is a sectional view of the reagent injector of FIG. 14.
Figure 17:
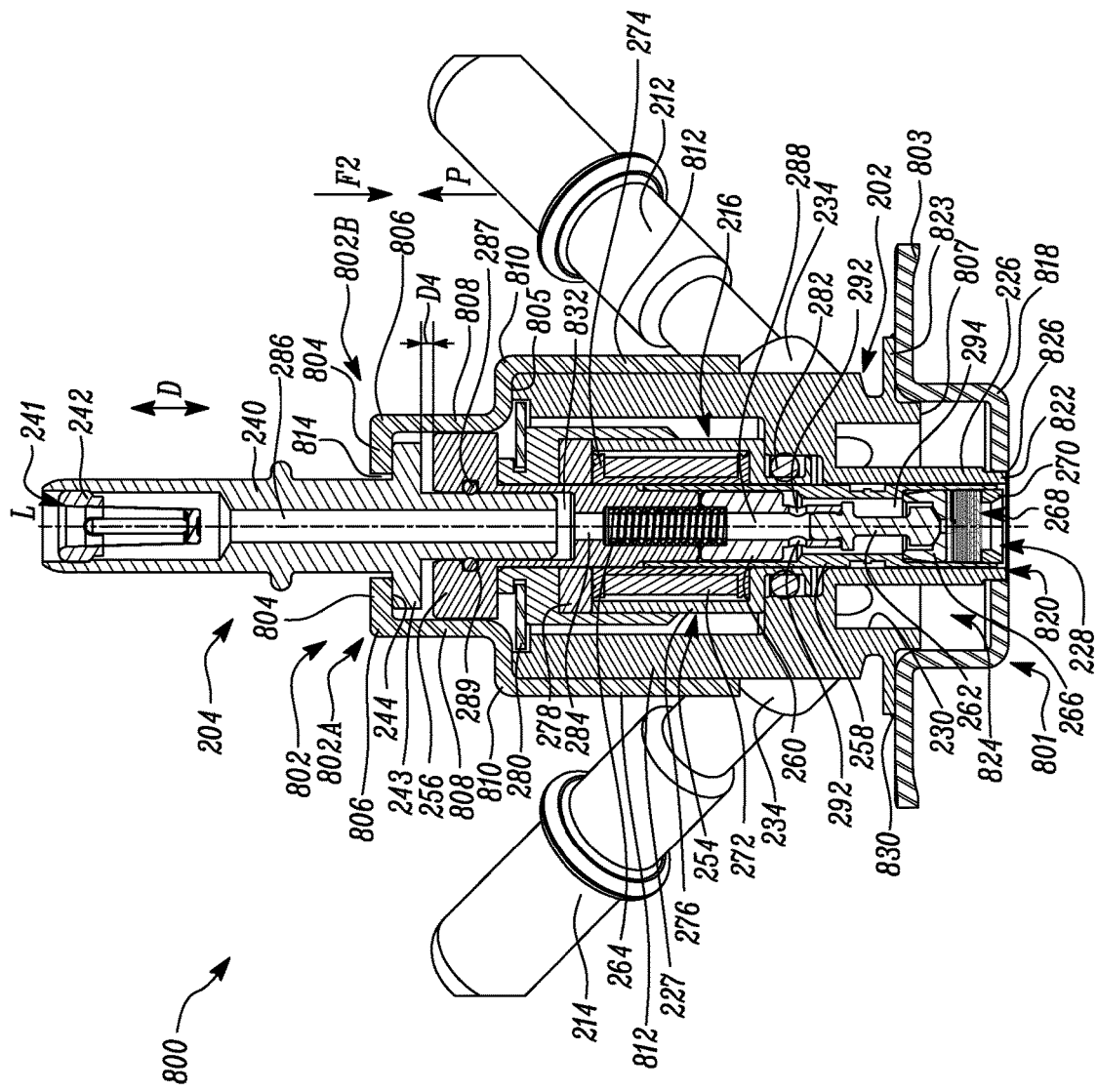
FIG. 17 is a sectional view of the reagent injector of FIG. 14 in an extended configuration, according to an aspect of the present disclosure.

FIG. 14 illustrates a perspective view of an injector 800, in accordance with another aspect of the present disclosure. FIG. 15 illustrates a perspective view of a cover member 801 of the injector 800, in accordance with an embodiment of the present disclosure. FIGS. 16 and 17 illustrate sectional views of the injector 800. The injector 800 is substantially similar in structure and function to the injector 110 described above with reference to FIGS. 2-7. Similar components have therefore been provided with similar reference numerals. However, a spring member 802 of the injector 800 may also act as a top cap for the first body 202. Further, the injector 800 includes the cover member 801 that is coupled to the first body 202. The cover member 801 includes an integral flange portion 803 for mounting the injector 800 on a component. Moreover, the first body 202 defines a first end 805 and a second end 807 opposite to the first end 805. Both the first and second ends 805, 807 may be open. Further, the first end 805 and the second end 807 may be spaced apart from each other with respect to the longitudinal axis 'L' of the injector 800. Specifically, the first and second ends 805, 807 may be axial ends of the injector 800. The first end 805 may be a top end and is proximal to the second body 204. The second end 807 may be a bottom end and is adjacent to the cover member 801. The first end 805 may also allow insertion and/or removal of the valve assembly 216 from the injector 800. The recessed portion 230 is disposed at the second end 807. The conduit portion 226 of the injector 800 may also be disposed at the second end 807 and extends from the recessed portion 230. The outlet opening 228 is disposed proximal to the second end 807 of the first body 202. Further, the outlet opening 228 is defined by the conduit portion 226. The cover member 801 is adapted to at least partially cover the second end 807 of the injector 800.

The spring member 802 is positioned between the first body 202 and the second body 204. The spring member 802 is adapted to allow movement of the second body 204 relative to the first body 202 in response to expansion of the reagent during freezing. The spring member 802 may at least partially cover the first end 805 of the injector 800. Further, the spring member 802 may retain various parts of the valve assembly 216 within the first body 202. The spring member 802 is positioned between the first body 202 and the second body 204. The spring member 802 may also movably connect the second body 204 to the first body 202. Therefore, the second body 204 is movably coupled to the first body 202. In the illustrated embodiment, as shown in FIG. 16, the spring member 802 includes a first spring part 802A and a second spring part 802B. The first and second spring parts 802A, 802B may be separate components, and are connected to the first body 202 and the second body 204 independently of one another. In an embodiment, each of the first and second spring parts 802A, 802B are detachably coupled to the first body 202 and the second body 204. The first and second spring parts 802A, 802B may snap onto the first and second bodies 202, 204. Specifically, each of the first and second spring parts 802A, 802B may be a deformable clip that are attachable to the first body 202 and the second body 204 by respective snap-fit connections. Further, each of the first and second spring parts 802A, 802B may be easily removed from the injector 800 by deforming each of the first and second spring parts 802A, 802B away from the longitudinal axis 'L' of the injector 800. This may facilitate servicing and/or replacement of one or more internal components (e.g., the valve assembly 216). In an embodiment, each of the first and second spring parts 802A, 802B of the spring member 802 may be a generally flat spring. Further, each of the first and second spring parts 802A, 802B may be formed by at least one stamping or molding process. In a further embodiment, each of the first and second spring parts 802A, 802B may be made of a metal or a metal alloy. Each of the first and second spring parts 802A, 802B includes a main portion 804, an intermediate portion 806, a first elongate portion 808, a second intermediate portion 810, and a second elongate portion 812.

The main portion 804 of each of the first and second spring parts 802A, 802B is disposed on the flange section 243 of the reagent tube 240. Further, the main portion 804 is pressed against the upper surface 244 of the flange section 243. The upper surface 244 may include a lip contour so that the main portion 804 snaps or clips onto the second body 204. This may also prevent a rotation of the second body 204. In another embodiment, the main portion 804 may be connected to a substantially circular area of the flange section 243 of the reagent tube 240. The main portion 804 may be a circular segment. The main portions 804 of the first and second spring parts 802A, 802B together define a main aperture 814. The main aperture 814 is at least partially arranged around the reagent tube 240. In an embodiment, the main portion 804 may not include a fully enclosed aperture. For example, the main aperture 814 may be substantially U-shaped. The main aperture 814 therefore allows the reagent tube 240 to extend therethrough. In an embodiment, the main portion 804 may include a curved end (not shown) for securing the corresponding first and second spring parts 802A, 802B to the second body 204. Further, the first and second spring parts 802A, 802 may be removed from the second body 204 by bending the corresponding main portions 804 away from the longitudinal axis 'L' of the injector 800.

The first intermediate portion 806 of each of the first and second spring parts 802A, 802B may extend from the main portion 804. In another embodiment, the main portion 804 may be an end or an extension of the first intermediate portion 806 that is in contact with the second body 204. In an undeformed or normal state, as shown in FIG. 16, the first intermediate portion 806 has a curvilinear shape that extends upwards from the main portion 804 and then curves downwards towards the first elongate portion 808. In a deformed state or configuration, as shown in FIG. 17, a part of the first intermediate portion 806 is oriented substantially parallel to the main portion 804. After the first intermediate portion 806 is deformed or flexed to a point where the part of the first intermediate portion 806 is oriented substantially parallel to the main portion 804, the spring member 802 may limit the maximum axial movement of the second body 204 relative to the first body 202. A distance 'D4' (shown in FIG. 17) may correspond to the maximum axial movement of the second body 204 relative to the first body 202. The distance 'D4' may be the distance between the second body 204 and the pole piece 256.

The first elongate portion 808 of each of the first and second spring parts 802A, 802B extends from the first intermediate portion 806. The first intermediate portion 806 may therefore be disposed between the main portion 804 and the first elongate portion 808. Further, the first elongate portion 808 may be detachably connected to the pole piece 256. Such a detachable connection may enable the second body 204 to be removed from the first body 202, thereby allowing servicing and/or replacement of one or more internal components (e.g., the valve assembly 216) of the injector 800. In a further embodiment, the first elongate portion 808 may be connected to the pole piece 256 by a snap-fit connection. Moreover, the first elongate portion 808 may be flexed or deformed away from the pole piece 256 to allow servicing of one or more core components of the injector 800.

The second intermediate portion 810 of each of the first and second spring parts 802A, 802B extends from the first elongate portion 808. The first intermediate portion 806 may therefore be disposed at an end of the first elongate portion 808, while the second intermediate portion 810 may be disposed at an opposite end of the first elongate portion 808. Specifically, the first elongate portion 808 may be disposed between the first and second intermediate portions 806, 810. The second intermediate portions 810 of the first and second spring parts 802A, 802B may together act as a top cap for the first body 202. Specifically, the second intermediate portions 810 at least partially cover the first end 805 of the first body 202. The second intermediate portion 810 may therefore be a cap portion of each of the first and second spring parts 802A, 802B. The second intermediate portion 810 may have a curvilinear shape that extends downward from the first elongate portion 808 and is then oriented substantially normal to the longitudinal axis 'L' of the injector 800. The second intermediate portion 810 may further curve to meet the second elongate portion 812. The first end 805 of the first body 202 may be rounded or chamfered to conform to the curvilinear shape of the second intermediate portions 810 of the first and second spring parts 802A, 802B. The second intermediate portion 810 may be detachably connected to the first body 202. Such a detachable connection may enable the second body 204 to be removed from the first body 202, thereby allowing servicing and/or replacement of one or more internal components (e.g., the valve assembly 216) of the injector 800. In a further embodiment, the second intermediate portion 810 may be connected to the first body 202 by a snap-fit connection. Moreover, the second intermediate portion 810 may be flexed or deformed away from the first body 202 to allow servicing of one or more core components of the injector 800.

The second elongate portion 812 of each of the first and second spring parts 802A, 802B extends from the second intermediate portion 810. Further, the second elongate portion 812 may be detachably connected to the first body 202. Such a detachable connection may enable the second elongate portion 812 to be removed from the first body 202, thereby allowing servicing and/or replacement of one or more internal components (e.g., the valve assembly 216) of the injector 800. In a further embodiment, the second elongate portion 812 may be connected to the first body 202 by a snap-fit connection. Moreover, the second elongate portion 812 may be flexed or deformed away from the first body 202 to allow servicing of one or more core components of the injector 800. In an embodiment, the second elongate portion 812 may include a curved end (not shown) that engages with a lip (not shown) of the first body 202 in order to secure the corresponding first and second spring parts 802A, 802B to the first body 202.

The cover member 801 includes a cup portion 818 and the flange portion 803 that is integral with the cup portion 818. The flange portion 803 may extend outwardly from the cup potion 818. The cup portion 818 is adapted to at least partially cover the second end 807 of the first body 202. The cup portion 818 may have a substantially axisymmetric configuration. Specifically, the cup portion 818 may be substantially symmetric about the longitudinal axis 'L' of the injector 800. Further, the cup portion 818 of the cover member 801 defines a cover aperture 820 therethrough. The cover aperture 820 may be positioned centrally on the cup portion 818. The cover aperture 820 is adapted to at least partially receive the conduit portion 226 of the injector 800. Specifically, the cover aperture 820 may receive an end 822 of the conduit portion 226. The conduit portion 226 may further include a step adjacent to the end 822 so that the conduit portion 226 may be supported on the cup portion 818. In the illustrated embodiment, the cover aperture 820 is substantially circular. However, the cover aperture 820 may have any suitable shape to at least partially receive the conduit portion 226 therein. In an embodiment, the cup portion 818 may be press-fitted onto the conduit portion 226. Specifically, an inner diameter of the cup portion 818 that defines the cover aperture 820 may be press-fitted on the end 822 of the conduit portion 226. A clearance fit may be provided between the cup portion 818 and an outer diameter of the second end 807 of the first body 202. In another embodiment, the cup portion 818 may be further welded to the conduit portion 226 at one or more weld locations or points. Specifically, the cup portion 818 may be welded to the conduit portion 226 at a first weld location 826. In other embodiments, the cup portion 818 may be connected to the first body 202 by various other methods, such as brazing, mechanical fasteners, adhesives, and so forth. The cup portion 818 may act as a bottom cap or port cover for the injector 800. Further, the first body 202 and the cup portion 818 may together define a fluid chamber 824. The fluid chamber 824 may at least partly surround the conduit portion 226. Specifically, the cup portion 818, the recessed portion 230 and the conduit portion 226 may define the fluid chamber 824. The fluid inlet and outlet tubes 212, 214 of the injector 800 may be in fluid communication with the fluid chamber 824. Specifically, the fluid inlet 236 (shown in FIG. 3) of the fluid inlet tube 212 is disposed in fluid communication with the fluid chamber 824. Similarly, the fluid outlet 238 (shown in FIG. 3) of the fluid outlet tube 214 is disposed in fluid communication with the fluid chamber 824. The fluid inlet 236 may be arranged to receive a fluid that is different from the reagent. In an embodiment, the fluid may be a coolant (e.g., water). The fluid inlet 236 may receive the fluid from the cooling system 130 (shown in FIG. 1) via the fluid supply line 132. The fluid passage 239 (shown in FIG. 5) of the fluid inlet tube 212 may be in fluid communication with the inclined bore 245 (shown in FIG. 5) of the first body 202. The inclined bore 245 may be in fluid communication with the fluid chamber 824. Further, the fluid in the fluid chamber 824 may exit the injector 800 through the fluid outlet tube 214. A flow passage (not shown) of the fluid outlet tube 214 may be in fluid communication with another inclined bore (not shown) of the first body 202. This inclined bore may be in fluid communication with the fluid chamber 824. The fluid chamber 824 may act as a cooling chamber for one or more components of the injector 800. The cooling function of the fluid chamber 824 may be substantially similar to the cooling function of the fluid chamber 232 (shown in FIG. 5) of the injector 110.

The flange portion 803 may be integral with the cup portion 818 of the cover member 801. Therefore, the cover member 801 may incorporate both a port cover and a mounting flange or bracket of the injector 800 in a one-piece design. The cover member 801 may be manufactured by stamping or investment casting. Further, the cover member 801 may be made of a metal or a metal alloy. The flange portion 803 may be a complex thin walled mounting plate that extends from an outer part of the cup portion 818. The flange portion 803 further defines at least one mounting aperture or hole 828. In the illustrated embodiment of FIG. 15, the flange portion 803 includes three mounting holes 828. Each of the mounting holes 828 has a circular shape. However, each of the mounting holes 828 may have any alternative shape as per requirements. The mounting holes 828 may enable the flange portion 803, and therefore the injector 800, to be mounted on a component via mechanical fasteners, such as bolts. The component may be the exhaust conduit 106 (shown in FIG. 1) of the exhaust system 100. In an embodiment, the flange portion 803 may be welded to the first body 202 at one or more weld locations or points. Specifically, the flange portion 803 may be welded to an extending portion 823 of the first body 202 at a second weld location 830. In other embodiments, the flange portion 803 may be connected to the first body 202 by various other methods, such as brazing, mechanical fasteners, adhesives, and so forth.

Since the cup portion 818 and the flange portion 803 are integral with each other, the cover member 801 may eliminate at least one weld joint, thereby reducing an assembly cycle time and associated cost. The cover member 801 may also eliminate potential alignment issues (for example, radial clearance) between the cup portion 818 and the first body 202 that may otherwise adversely impact the welding process. The cover member 801 may also provide an additional thermal benefit by directly cooling the integral flange portion 803. The cover member 801 may also reduce costs as the port cover and the mounting flange are integrally manufactured, and not as separate components. Though the cover member 801 is described with reference to the injector 800, it may be contemplated to incorporate the cover member 801 in the injectors 110, 400, 600, described above.

In an embodiment, each of the first and second springs parts 802A, 802B of the spring member 802 is pre-loaded to bias the second body 204 towards the first body 202. In another embodiment, the first and second spring parts 802A, 802B of the spring member 802 are further configured to bias or push the valve assembly 216 towards the first body 202. The second body 204 may move against the biasing of the first and second spring parts 802A, 802B in response to expansion of the reagent during freezing. The first and second spring parts 802A, 802B are further configured to limit a maximum movement of the second body 204, relative to the first body 202, in response to expansion of the reagent during freezing. Specifically, the first and second spring parts 802A, 802B may apply a biasing force 'F2' against the pressure 'P' exerted by the reagent during freezing. The reagent may expand in a frozen condition due to the formation of ice. Expansion of the reagent is therefore caused by expansion of ice. The pressure 'P' is exerted by ice that is formed due to freezing of the reagent. The first and second spring parts 802A, 802B may be further configured to at least partially cover the first end 805 of the first body 202.

The second body 204 including the reagent tube 240 may be axially displaced from the first body 202 in response to expansion of the reagent during freezing. The first and second spring parts 802A, 802B may limit a maximum axial movement of the second body 204. In a displaced state, as shown in FIG. 17, the reagent tube 240 and the pole piece 256 may define an expansion chamber 832 therebetween. The expansion chamber 832 may allow expansion of the reagent during freezing. The expansion chamber 832 may therefore act as a reservoir for the freezing reagent. Specifically, the expansion chamber 832 may act as a reservoir for ice formed due to freezing of the reagent. Since ice is allowed to expand, damage to various components of the injector 800 may be prevented. Further, the sealing member 287 may prevent any leakage of the reagent from the expansion chamber 832. A volume of the expansion chamber 832 may be optimized to allow adequate expansion of ice formed in the frozen condition of the reagent.

In a normal position of the second body 204, as illustrated in FIG. 16, the first and second spring parts 802A, 802B are pre-loaded to bias the second body 204 towards the first body 202. This may correspond to an unfrozen condition of the reagent. In the normal position, the flange section 243 of the second body 204 may be further disposed on an end of the pole piece 256. The reagent may expand in a frozen condition. In the illustrated embodiment, the injector 800 may be substantially rigid in a radial direction. Consequently, the reagent may expand along the axial direction 'D'. Further, the freezing reagent may apply the pressure 'P' on the second body 204 due to expansion, causing the second body 204 to be displaced along the axial direction 'D' away from the first body 202. The pressure 'P' may be exerted by expanding ice which is formed in the frozen condition of the reagent. Each of the first and second spring parts 802A, 802B also deforms to allow the movement of the second body 204 along the axial direction 'D'. Specifically, the first intermediate portion 806 of each of the first and second spring parts 802A, 802B may deform to allow the movement of the second body 204 relative to the first body 202. However, the biasing force 'F2' applied by the first and second spring parts 802A, 80B may limit the maximum movement of the second body 204 and retain the second body 204 at the distance 'D4' (shown in FIG. 17) from the end of the pole piece 256. This may correspond to an extended position or configuration of the second body 204. Therefore, the biasing force 'F2' applied by the first and second spring parts 802A, 802B due to pre-loading may counteract the pressure 'P' applied by the reagent in the frozen condition. The expansion chamber 832 formed due to the movement of the second body 204 may also provide space for the reagent to expand during freezing. The sealing member 287 may prevent any leakage of the reagent from the injector 800. Upon subsequent thawing of the reagent, the reagent may contract. The pressure 'P' may no longer be applied on the second body 204. The first and second spring parts 802A, 802B may bias the second body 204 towards the first body 202 after ice has thawed. Specifically, the first and second spring parts 802A, 802B may displace the second body 204 and retain the second body 204 against the end of the pole piece 256.

The injector 800 may therefore include a freeze protection feature including the spring member 802 that allows the reagent to safely expand during freezing. Therefore, any damage to the injector 800 due to the freezing reagent may be substantially prevented. Any leakage of the reagent may also be prevented by the sealing member 287. After the reagent has thawed, the first and second spring parts 802A, 802B of the spring member 802 further move the second body 204 to its normal position. The first and second spring parts 802A, 802B may additionally function as a top cap for the first body 202. Specifically, the second intermediate portions 810 of the first and second spring parts 802A, 802B may at least partially cover the first end 805 of the first body 202. The second intermediate portions 810 may therefore retain at least one core or internal component (for example, the valve assembly 216) of the injector 800 within the first body 202. The second intermediate portions 810 may also be flexed away from the first body 202 to allow servicing of one or more core components of the injector 800. Specifically, the second intermediate portions 810 may allow one or more components of the valve assembly 216 to be removed from the first body 202.

Figure 18:
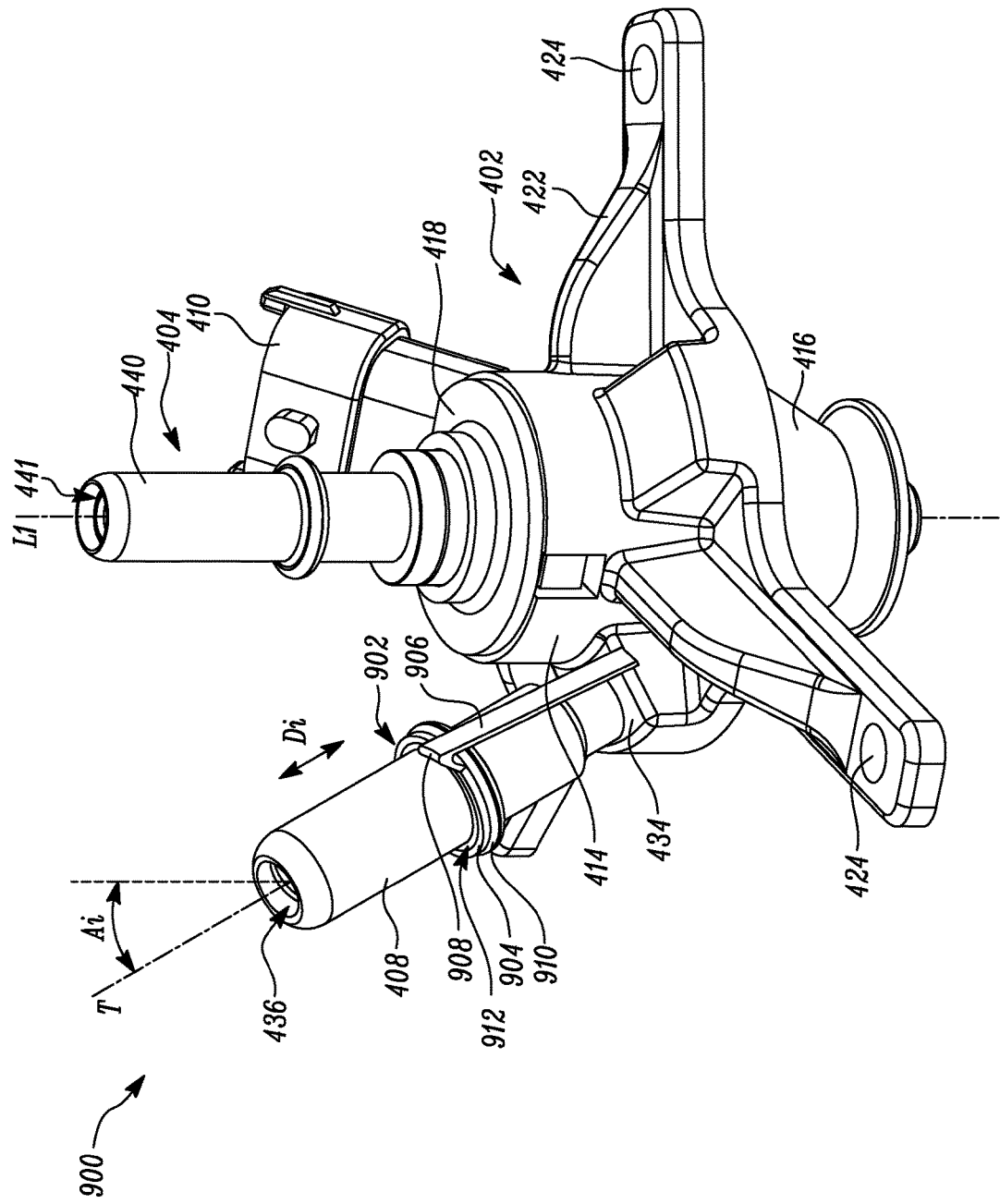
FIG. 18 is a perspective view of a reagent injector, according to another aspect of the present disclosure.

FIG. 18 illustrates a perspective view of an injector 900, in accordance with another aspect of the present disclosure. The injector 900 is substantially similar in structure and function to the injector 400 described above with reference to FIGS. 8-11. Similar components have therefore been provided with similar reference numerals. However, a spring member 902 of the injector 600 is disposed between the reagent outlet tube 408 and the first body 402. The reagent outlet tube 408 defines a tube axis 'T' that is inclined at an angle 'Ai' relative to the longitudinal axis 'L1' of the injector 900. Further, instead of the second body 404, the reagent outlet tube 408 is movable with respect to the first body 402. Specifically, the reagent outlet tube 408 is movable along an inclined direction 'Di' that is substantially parallel to the tube axis 'T'. Therefore, the movement of the reagent outlet tube 408 is inclined at the angle 'Ai' with respect to the longitudinal axis 'L1'. The spring member 902 movably connects the reagent outlet tube 408 to the first body 402. Further, the spring member 902 is pre-loaded to bias the reagent outlet tube 408 towards the first body 402. The spring member 902 may also limit the movement of the reagent outlet tube 408 in response to expansion of the reagent during freezing. The spring member 902 may further move the reagent outlet tube 408 to a normal position (as shown in FIG. 18) when the reagent has thawed.

In an embodiment, the spring member 902 may be a substantially flat spring. Further, the spring member 902 may be formed by at least one stamping or molding process. In a further embodiment, the spring member 902 may be made of a metal or a metal alloy. The spring member 902 includes a main portion 904, a pair of elongate portions 906 (only one shown in FIG. 18), and a pair of intermediate portions 908 (only one shown in FIG. 18) disposed between the main portion 904 and the corresponding elongate portions 906.

The main portion 904 is disposed on the flange section 910 of the reagent outlet tube 408. Further, the main portion 904 is pressed against the upper surface 911 (shown in FIG. 8) of the flange section 910. The main portion 904 may have an annular shape defining a main aperture 912. Though in the illustrated embodiment, the main aperture 912 has a substantially circular shape, other shapes of the main aperture 912 may be contemplated within the scope of the present disclosure. Such shapes of the main aperture 912 may include polygonal, elliptical, etc. The main aperture 912 is at least partially arranged around the reagent outlet tube 408. The main aperture 912 therefore allows the reagent outlet tube 408 to extend therethrough. In an embodiment, the main portion 904 may be press-fitted on the flange section 910 of the reagent outlet tube 408. In other embodiments, the main portion 904 may be attached to the reagent outlet tube 408 by various methods, such as welding, brazing, adhesives, mechanical fasteners, and so forth. In another embodiment, the main portion 904 may be detachably connected to the reagent outlet tube 408.

The intermediate portions 908 may extend from diametrically opposite sides of the main portion 904. In an undeformed or normal state, as shown in FIG. 18, each of the intermediate portions 908 has a curvilinear shape that extends upwards from the main portion 904 and then curves downwards towards the respective elongate portion 906. Each intermediate portion 908 is adapted to deform to allow movement of the reagent outlet tube 408 relative to the first body 402. Specifically, each intermediate portion 908 deforms to allow movement of the reagent outlet tube 408 away from the first body 402 along the inclined direction 'Di'. In a deformed state, the spring member 902 may limit the maximum movement of the reagent outlet tube 408 relative to the first body 402.

Each elongate portion 906 includes a substantially planar shape. In the illustrated embodiment, each elongate portion 906 is connected to the receiving portion 434 of the first body 402. In an embodiment, each elongate portion 906 is connected to the first body 402 by welding. In other embodiments, each elongate portion 906 may be connected to the first body 402 by various methods, such as brazing, mechanical fasteners, adhesives, and so forth. In another embodiment, each elongate portion 906 may be detachably connected to the first body 402 by any non-permanent joining method. Such a detachable connection may enable the reagent outlet tube 408 to be removed from the first body 402, thereby allowing servicing and/or replacement of one or more internal components of the injector 900. In a further embodiment, each elongate portion 906 may be connected to the first body 402 by a snap-fit connection.

In an embodiment, the spring member 902 is pre-loaded to bias the reagent outlet tube 408 towards the first body 402. The reagent outlet tube 408 may move against the biasing of the spring member 902 in response to expansion of the reagent during freezing. The spring member 902 is further configured to limit a maximum movement of the reagent outlet tube 408, relative to the first body 402, in response to expansion of the reagent during freezing.

In an embodiment, a sealing member (not shown) may be disposed between the reagent outlet tube 408 and first body 402. The sealing member may be an O-ring. The sealing member may prevent leakage of the reagent from the injector 900 during movement of the reagent outlet tube 408.

In a normal position of the reagent outlet tube 408, as illustrated in FIG. 18, the spring member 902 is pre-loaded to bias the reagent outlet tube 408 towards the first body 402. This may correspond to an unfrozen condition of the reagent. The reagent may expand in a frozen condition. The freezing reagent may apply a pressure on the reagent outlet tube 408 due to expansion, causing the reagent outlet tube 408 to be displaced along the inclined direction 'Di' away from the first body 402. The spring member 902 also deforms to allow the movement of the reagent outlet tube 408 along the inclined direction 'Di'. Specifically, the intermediate portions 908 of the spring member 902 may deform to allow the movement of the reagent outlet tube 408 relative to the first body 402. However, a biasing force applied by the spring member 902 may limit the movement of the reagent outlet tube 408 and retain the reagent outlet tube 408 at a predetermined distance relative to the first body 402. Therefore, the biasing force applied by the spring member 902 due to pre-loading may counteract the pressure applied by the reagent in the frozen condition. An expansion chamber (not shown) formed due to the movement of the reagent outlet tube 408 may also provide space for the reagent to expand during freezing. The sealing member may prevent any leakage of the reagent from the injector 900. Upon subsequent thawing of the reagent, the reagent may contract. The pressure may no longer be applied on the reagent outlet tube 408. The spring member 902 may bias the reagent outlet tube 408 towards the first body 402 after ice has thawed.

The injector 900 may therefore include a freeze protection feature including the spring member 902 that allows the reagent to safely expand during freezing. Therefore, any damage to the injector 900 due to the freezing reagent may be substantially prevented. Any leakage of the reagent may also be prevented by the sealing member. After the reagent has thawed, the spring member 902 further moves the reagent outlet tube 408 to its normal position.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An injector for injecting a reagent, the injector comprising:
   a first injector body including an outlet opening;
   a second injector body including a reagent tube, wherein the second injector body is movable relative to the first injector body;
   a valve assembly at least partly enclosed by the first injector body, wherein the valve assembly is configured to selectively dispense the reagent through the outlet opening of the first injector body; and
   a spring member positioned between the first injector body and the second injector body, wherein the spring member is pre-loaded to bias the second injector body towards the first injector body, and wherein the spring member is configured to bias the valve assembly towards the first injector body, and wherein the spring member is further configured to limit a maximum movement of the second injector body relative to the first injector body in response to expansion of the reagent during freezing.

2. The injector of claim 1, further including a sealing member disposed between the second injector body and one of the valve assembly and the first injector body.

3. The injector of claim 1, further including:
   a fluid inlet in fluid communication with a fluid chamber of the first injector body, wherein the fluid inlet is arranged to receive a fluid that is different from the reagent; and
   a fluid outlet in fluid communication with the fluid chamber of the first injector body.

4. The injector of claim 1, further including a reagent outlet in fluid communication with a chamber of the first injector body.

5. The injector of claim 1, wherein the valve assembly further includes an electromagnet.

6. The injector of claim 1, wherein the spring member includes:
   a main portion pressed against a surface of the second injector body;
   at least one elongate portion connected to the first injector body; and
   an intermediate portion disposed between the main portion and the at least one elongate portion, wherein the intermediate portion is adapted to deform to allow movement of the second injector body relative to the first injector body.

7. The injector of claim 6, wherein the main portion of the spring member further defines an aperture at least partially arranged around the reagent tube.

8. An injector for injecting a reagent, the injector comprising:
   a first injector body including an outlet opening;
   a second injector body including a reagent tube, wherein the second injector body is movable relative to the first injector body in response to expansion of the reagent during freezing;
   a valve assembly at least partly enclosed by the first injector body, wherein the valve assembly is configured to selectively dispense the reagent through the outlet opening of the first injector body; and
   a flat spring positioned between the first injector body and the second injector body, wherein the flat spring is pre-loaded to bias the second injector body towards the first injector body, and wherein the flat spring is further configured to apply a biasing force against a pressure exerted by the reagent during freezing.

9. The injector of claim 8, further including a sealing member disposed between the second injector body and one of the valve assembly and first injector body.

10. The injector of claim 8, further including:
    a fluid inlet in fluid communication with a fluid chamber of the first injector body, wherein the fluid inlet is arranged to receive a fluid that is different from the reagent; and
    a fluid outlet in fluid communication with the fluid chamber of the first injector body.

11. The injector of claim 8, further including a reagent outlet in fluid communication with a chamber of the first injector body.

12. The injector of claim 8, wherein the valve assembly further includes an electromagnet.

13. The injector of claim 8, wherein the flat spring is further configured to bias the valve assembly towards the first injector body.

14. The injector of claim 8, wherein the flat spring includes:
    a main portion pressed against a surface of the second injector body;
    at least one elongate portion connected to the first injector body; and
    an intermediate portion disposed between the main portion and the at least one elongate portion, wherein the intermediate portion is adapted to deform to allow movement of the second injector body relative to the first injector body.

15. The injector of claim 14, wherein the main portion of the flat spring further defines an aperture at least partially arranged around the reagent tube.

16. An injector for injecting a reagent, the injector comprising:
    a first injector body including an outlet opening;
    a reagent outlet in fluid communication with a chamber of the first injector body;
    a second injector body including a reagent tube, wherein the second injector body is movable relative to the first injector body;
    a valve assembly at least partly enclosed by the first injector body, wherein the valve assembly is configured to selectively dispense the reagent through the outlet opening of the first injector body; and
    a spring member positioned between the first injector body and the second injector body, wherein the spring member is pre-loaded to bias the second injector body towards the first injector body, and wherein the spring member is further configured to limit a maximum movement of the second injector body relative to the first injector body in response to expansion of the reagent during freezing.

17. The injector of claim 16, further including a sealing member disposed between the second injector body and one of the valve assembly and the first injector body.

18. The injector of claim 16, further including:
- a fluid inlet in fluid communication with a fluid chamber of the first injector body, wherein the fluid inlet is arranged to receive a fluid that is different from the reagent; and
- a fluid outlet in fluid communication with the fluid chamber of the first injector body.

19. The injector of claim 16, wherein the spring member includes:
- a main portion pressed against a surface of the second injector body;
- at least one elongate portion connected to the first injector body; and
- an intermediate portion disposed between the main portion and the at least one elongate portion, wherein the intermediate portion is adapted to deform to allow movement of the second injector body relative to the first injector body.

20. The injector of claim 19, wherein the main portion of the spring member further defines an aperture at least partially arranged around the reagent tube.

* * * * *